US010603849B2

(12) United States Patent
Boge et al.

(10) Patent No.: US 10,603,849 B2
(45) Date of Patent: Mar. 31, 2020

(54) FIBER-LAYING MACHINE

(71) Applicant: Broetje-Automation GmbH, Rastede (DE)

(72) Inventors: Christian Boge, Mosbach (DE); Matthias Meyer, Weil am Rhein (DE); Axel Peters, Bremen (DE)

(73) Assignee: Broetje-Automation GmbH, Rastede (DE)

( * ) Notice: Subject to any disclaimer, the term of this patent is extended or adjusted under 35 U.S.C. 154(b) by 158 days.

(21) Appl. No.: 15/556,226

(22) PCT Filed: Mar. 4, 2016

(86) PCT No.: PCT/EP2016/054678
§ 371 (c)(1),
(2) Date: Sep. 6, 2017

(87) PCT Pub. No.: WO2016/142297
PCT Pub. Date: Sep. 15, 2016

(65) Prior Publication Data
US 2018/0036968 A1    Feb. 8, 2018

(30) Foreign Application Priority Data

Mar. 6, 2015 (DE) .......................... 10 2015 002 777

(51) Int. Cl.
  *B29C 70/38* (2006.01)
  *B29C 70/54* (2006.01)
(52) U.S. Cl.
  CPC .......... *B29C 70/384* (2013.01); *B29C 70/382* (2013.01); *B29C 70/545* (2013.01)
(58) Field of Classification Search
  CPC .... B29C 70/545; B29C 70/382; B29C 70/384
  See application file for complete search history.

(56) References Cited

U.S. PATENT DOCUMENTS 3,574,040 A * 4/1971 Chitwood ............. B29C 70/386
                                                                156/350
5,110,395 A * 5/1992 Vaniglia ............. B29C 53/8016
                                                                156/175
(Continued)

FOREIGN PATENT DOCUMENTS

DE        10005202        11/2000
DE        10005202 A1 *   11/2000    ............. B29C 70/50
(Continued)

OTHER PUBLICATIONS

Machine Translation of DE-10005202-A1 (Year: 2000).*
(Continued)

*Primary Examiner* — Daniel McNally
(74) *Attorney, Agent, or Firm* — Pauly, DeVries Smith & Deffner LLC

(57) ABSTRACT

Various embodiments relate to a fiber-laying machine for producing laid fiber scrims, including a tool table for feeding a workpiece along a feed direction; a laying head for applying fibers onto the workpiece; and a fiber-providing unit for feeding several fiber strands to the laying head; the several fiber strands are combined on the laying head to form a fiber web which is to be applied onto the workpiece; the laying head is movable in a laying direction relative to the fiber-providing unit; a clamping device is arranged on the laying head for releasably clamping the fiber strands, a portion of the fiber web is laid on the workpiece once the fiber strands have been pulled forward by a laying stroke by means of the laying head such that while the fibers are being applied on the workpiece, no fibers are pulled out of the fiber-providing unit.

26 Claims, 12 Drawing Sheets

(56) References Cited

U.S. PATENT DOCUMENTS

| | | | |
|---|---|---|---|
| 6,540,000 B1* | 4/2003 | Darrieux | B29C 70/384 156/180 |
| 2004/0253429 A1* | 12/2004 | Polk, Jr. | B29C 43/34 428/292.1 |
| 2009/0032195 A1* | 2/2009 | Slyne | B29C 70/388 156/361 |
| 2009/0148647 A1* | 6/2009 | Jones | B29C 70/30 428/58 |
| 2014/0260858 A1* | 9/2014 | Johnson | B32B 38/0004 83/156 |
| 2018/0036966 A1 | 2/2018 | Boge et al. | |

FOREIGN PATENT DOCUMENTS

| | | | |
|---|---|---|---|
| DE | 102007037072 | 2/2009 | |
| EP | 1001066 | 5/2000 | |
| EP | 2230070 | 9/2010 | |
| FR | 2686080 | 7/1993 | |
| FR | 2686080 A1 * | 7/1993 | B29C 70/32 |
| FR | 3006938 | 12/2014 | |
| WO | 9636477 | 11/1996 | |
| WO | 2009042225 | 4/2009 | |
| WO | 2011085792 | 7/2011 | |
| WO | 2014191046 | 12/2014 | |
| WO | 2016142297 | 9/2016 | |
| WO | 2016142299 | 9/2016 | |

OTHER PUBLICATIONS

Machine Translation of FR-2686080-A1 (Year: 1993).*
"International Preliminary Report on Patentability," for PCT Application No. PCT/EP2016/054678 dated Sep. 12, 2017 (10 pages).
"International Preliminary Report on Patentability," for PCT Application No. PCT/EP2016/054680 dated Sep. 12, 2017 (10 pages).
"International Search Report and Written Opinion," for PCT Application No. PCT/EP2016/054678 dated Sep. 15, 2016 (18 pages).
"International Search Report and Written Opinion," for PCT Application No. PCT/EP2016/054680 dated Sep. 22, 2016 (19 pages).

* cited by examiner

FIBER-LAYING MACHINE

CROSS-REFERENCE TO RELATED APPLICATIONS

This application is a national stage application under 35 U.S.C. 371 of International Patent Application Serial No. PCT/EP2016/054678, entitled "Fiber-laying Machine," filed Mar. 4, 2016, which claims priority from German Patent Application No. DE 10 2015 002 777.8, filed Mar. 6, 2015, the disclosure of which is incorporated herein by reference.

FIELD OF THE TECHNOLOGY

The disclosure relates to a fiber-laying machine and to a method for laying a fiber web on a workpiece. The disclosure additionally relates to a system for producing fiber composite components.

BACKGROUND

Publication WO 2009/042 225 A2 discloses a fiber-laying machine for producing fiber laid scrims. The fiber-laying machine comprises a triaxial table which is rotatable about a vertical rotational axis relative to a fiber-laying head and is movable in a linear manner in two directions. A vacuum table, which serves as a smooth tool surface, is arranged on the triaxial table. The fiber-laying head is arranged fixedly on a machine frame above the vacuum table and comprises guide rails for a fiber band, said guide rails being displaceable in a vertical direction by means of a linear actuator in order to deliver the fiber band to the workpiece surface.

SUMMARY

It is an object of the disclosure to provide a fiber-laying machine which enables fibers to be laid in a rapid and error-free manner.

Said object is achieved for a fiber-laying machine named in the introduction. As a result of pulling the fibers forward by the laying stroke, a laying operation is made possible where the fibers are pulled out of the providing unit prior to the actual application, the fibers being unwound from rollers in the majority of cases and guided by means of several deflectors. During the subsequent direct application onto the workpiece, the fibers no longer have to be pulled out of the fiber-providing unit. Dividing the fiber feed in this manner enables optimization of the respective movement portion of the laying head.

A workpiece in the sense of the disclosure is to be understood as any substrate onto which the fibers are applied as planned. In particular, such a substrate can be an even surface, for example in the form of a subsequently removable film or a smooth-coated surface of a carrier, from which the fiber laid scrim is subsequently detached. A partially finished fiber laid scrim or another preliminary step of a product which is to be covered with fibers also forms a workpiece in the sense of the disclosure. In addition, the substrate can be a preformed mold, in which a defined shaping of a subsequent under side of the fiber laid scrim is realized.

The individual fiber strands, in the case of a fiber-laying machine according to the disclosure, in a manner are already pre-coated with a binding agent when they are present in the fiber-providing unit. Such pre-coated fibers allow for particularly controlled adhesion or attachment to the fiber laid scrim, the amount of binding agent being dosed optimally at all times. To improve the binding operation, a heating device, for example in the form of a radiant heater, can be provided on the laying head. In principle, the feeding of pre-coated fibers to the laying head compared to uncoated fibers is accompanied by specific demands. Consequently, the design according to the disclosure of a fiber laying machine can specifically optimize fiber conveying for coated fibers. Such binding agents are also designated in expert circles as a matrix.

A disengageable clamping device is to be understood as any device which can exert sufficient holding forces onto the fiber strands in a clamped state in order to pull said fiber strands reliably out of the fiber-providing unit against their friction-based resistance.

A fiber-providing unit is to be understood in the sense of the disclosure as any storage area for outputting the fiber strands. In particular, the respective fiber strands can be wound onto interchangeable spools. The fiber-providing unit also includes deflections of the fiber strands, by means of which a feed to the movable laying head is effected. Positioning of the interchangeable spools or of a spool storage unit relative to the laying head is extensively freely selectable as a result.

In the case of embodiments of the disclosure, the spools can sit on rotational axes which are driven counter to an unwinding direction, the drives of the rotational axes comprising a torque limitation means. The torque limitation can be effected, for example, by means of a friction clutch or also by torque-dependent actuation of an electric drive. In this way, the respective fiber strand can be held at a defined pre-tension where required, in particular during unwinding.

In an embodiment, the fiber-providing unit can comprise one or several dancer hoppers in order to hold and to homogenize the conveying of the fiber strands at a defined tension.

In a generally advantageous manner, the workpiece is received in the fiber-laying machine so as to be pivotable about an axis such that the laying direction of the fibers is modifiable or adjustable relative to the workpiece. Depending on the requirement, a bracket of the workpiece can also comprise other movements, for example in a plane parallel to the laying direction.

In the case of an embodiment, the fiber-providing unit is arranged in a stationary manner. This allows for a large hopper of fiber strands with good maintenance access. Particularly, but not necessary, the laying head is movable relative to the fiber-providing unit only in precisely one plane. Such limitation of the movement of the laying head in one plane is realizable with relatively simple means for guiding the fiber strands between the laying head and the fiber-providing unit.

It is provided in an embodiment that the clamping device is disengaged whilst the portion of the fiber web is laid. A length of the fiber web, which is moved forward by the laying stroke and is situated in a storage region between the fiber-providing unit and the laying head, is laid in this case. The laying head, in this case, moves predominantly in the opposite direction to the movement by means of which the fiber web is pulled forward.

In the case of an embodiment, the clamping device includes at least one, particularly two pinch rollers which interact with one another. The use of pinch rollers reduces the accumulation of binding agent friction and fibers and in a simple manner enables the establishing of a break-away torque to protect the system in the event of a malfunction. In an embodiment, the pinch rollers can be provided with a freewheel counter to the pulling-forward direction. As a result, the pinch rollers can still be pressed together, for example, when a conveying member arranged downstream of the pinch rollers moves the fiber strands further forward already forward for laying. In a design of a detail, the pinch rollers are not released until shortly after the beginning of such a further forward feed in order to homogenize the guiding of the fibers overall.

A generally advantageously realized laying head includes two feeds which run at an angle with respect to one another, wherein by means of a first of the feeds a first group of fiber strands and by means of the second of the feeds a second group of fiber strands are guided into an intersection region in order to combine the two groups of fiber strands to form the fiber web. The groups of fiber strands, in this case, can be arranged offset by a width of a fiber strand perpendicular to the laying direction, and the combined groups of fiber strands can, for example, be homogenized by means of a compacting roller and applied to the workpiece. Such a laying head with two guides is realized, with regard to the alignment of the guides, in a manner substantially mirror-symmetrically in relation to a central plane.

In an embodiment, the fibers are severable by means of a cutting device arranged on the laying head, wherein the cutting device includes a plurality of separately actuatable cutting members which can sever different parts of the fibers transversely with respect to the laying direction. As a result, in general, the form of the start and/or the end of the respectively laid web can be shaped such that, even in the case of arbitrarily formed workpieces, there is a smaller edge-side protrusion or misalignment of the fiber web at best.

In an embodiment, the cutting device, in this case, has an actuator member for actuating at least one of the cutting members, wherein the actuator member is realized separately from the cutting member. In an embodiment, the actuator member is arranged on an upper part of the laying head which is removable for maintenance purposes. Such an upper part can be realized, for example, so as to be pivotable up in relation to a lower part such that the cutting members, which are subject to wear, and, where applicable, further mechanical elements of the laying head are accessible in a simple manner in the lower part. It is obvious where the laying head is realized with two guides which run at an angle with respect to one another, a respective upper part can be arranged above each of the guides. The fiber strands can run in the laying head in particular between the upper part and the lower part.

In an advantageous manner, at least one pre-feed roller is provided on the laying head for the driven forward feed, wherein the pre-feed roller is arranged between the clamping device and an outlet-side compacting roller of the laying head. The driven forward feed of fiber strands serves for applying the fiber web in a particularly homogeneous manner. In addition, the pre-feed roller serves for feeding an end of the fiber web, severed in the laying head, to the workpiece in order to begin laying a new fiber web.

In the case of an embodiment, the fiber-laying machine is constructed completely on a machine frame. This allows, where applicable, for simply offsetting or exchanging the entire fiber-laying machine in a production system without the machine having to be dismantled into individual parts. Such a design additionally favors integration of the fiber-laying machine into an automated production installation.

In an additionally advantageous manner, the fiber laying machine includes a climatically closed housing. This is to be understood in the sense of the disclosure as at least one region of the fiber-laying machine surrounding the workpiece inside the housing to be provided with controlled air conditioning. In particular during and immediately after the laying of fiber webs, such air conditioning is important for a good result. Air conditioning in the sense of the disclosure also includes simple temperature control without the influence of air moisture.

In order to be able to operate the fiber-laying machine simply and in order to promote integration into an automated production installation, the workpiece is arranged in a manner on an automated conveyable pallet. A pallet in the sense of the disclosure is to be understood as any exchangeable carrier for the workpiece.

In the case of a possible further development, it is possible to save on conveying space as a result of a surface of the pallet carrying the workpiece sloping at an angle of less than 30 degrees in relation to a perpendicular. This includes, in particular, a perpendicular alignment of the surface. In this way, it is possible to utilize a large room height in a production hall without, when conveying and feeding the pallets with the workpiece, the width taking up too much space. In said respect, it can also be provided that the laying direction runs in a plane which slopes at an angle of less than 30 degrees in relation to the perpendicular.

The object of the disclosure is additionally achieved by a method for laying a fiber web on a workpiece, said method including the steps of:

a. clamping the fibers to be laid in a clamping device of a laying head;

b. moving the laying head into a start position relative to a fiber-providing unit, wherein the fibers are pulled out of the fiber-providing unit by a laying stroke;

c. disengaging the clamping device;

d. moving the laying head from the start position into an end position whilst laying the fibers on the workpiece such that whilst the fibers are being applied on the workpiece, no fibers are pulled out of the fiber-providing unit.

Said operation ensures fibers are deposited in a homogenous manner on the workpiece without unwanted forces being introduced as a result of simultaneously pulling out fibers from the fiber-providing unit. In addition, the speed of the forward feed of the fibers and the laying speed can be adjusted independently of one another such that the entire operation is optimized. As a rule, the pulling-out of the fibers is effected following a first outward movement of the laying head where there is no contact with the workpiece. The laying head is then placed onto the workpiece such that the fibers pulled forward are deposited on the workpiece by means of an inward movement.

In an embodiment, the method is carried out by means of a fiber-laying machine according to the disclosure. In this case, in particular each of the specific features of a fiber-laying machine according to the disclosure is suitable as an individual feature for the improvement of a method according to the disclosure.

The fibers can be moved in relation to the laying head after step c. by means of a driven pre-feed roller, wherein the fibers are in particular not pulled out of the fiber-providing unit by means of the pre-feed roller. Consequently, an initial forward feed to the start of the laying operation can be achieved in a simple manner.

It must be pointed out that in dependence on the structural design of the fiber-laying machine, an arbitrary number of intermediate steps can be provided between the above-named method steps. Within the framework of all the steps provided in total, it must be ensured, in particular, that any fixing whatsoever of the fibers is continuously present in order to prevent the fibers leaving the fiber-laying head in an uncontrolled manner.

The object of the disclosure is additionally achieved by a system for producing fiber composite components, including
at least one first fiber laying machine for applying laid fiber scrims onto a workpiece; and
a further processing station, different to the fiber-laying machine, for modifying the workpiece,
wherein the workpiece is movable both to the fiber-laying machine and to the further processing station by means of an automated conveying device.

To date, fiber-laying machines have been used as individual machines for producing high-grade individual and costly components in small quantities. The attachment according to the disclosure of a fiber-laying machine to an automated production system for workpieces is provided in order to achieve a higher throughput of workpieces within the framework of series production.

In an embodiment, at least one fiber-laying machine of a system according to the disclosure is realized as a fiber-laying machine according to the disclosure. In general, however, a system according to the disclosure can also comprise several differently designed fiber-laying machines in order to optimize the process of workpiece production.

In an embodiment, the system includes a second fiber-laying machine which is spatially separated from the first fiber-laying machine and is connected to the first fiber-laying machine by means of the automated conveying device. In an embodiment, but not necessary, the at least two fiber-laying machines are, in this case, structurally identical.

In the case of a first possible further development, the fiber-laying machines, in this case, are provided as parallel processing stations which carry out the same processing steps on simultaneously processed workpieces. As a result, the throughput can be increased and adapted to a possibly higher throughput of other processing stations.

In the case of an embodiment which is an alternative to this or is in addition to it, it is provided that the fiber-laying machines carry out different processing steps one after another on a workpiece as sequential processing stations. As a result, the production of the workpiece is further optimizable and it is possible, in particular, for other processing steps to be performed between the processing operations in the fiber-laying machines.

The system includes in a generally advantageous manner at least one buffer station for receiving, storing and forwarding several workpieces. This allows for considerably improved logistics in automated production with a high throughput. In an embodiment, the workpieces remain in each case on their pallets in the buffer stations.

In an embodiment, the further processing station includes at least one item selected from the group of forming device, temperature chamber and/or painting device. Such a processing station is advantageously combined in automated form with the fiber-laying machine particularly for the production of series parts for automobiles or aircraft.

To save on floor space and for generally improved flexibility, the automated conveying device includes, in an embodiment, a loading device, by means of which it is possible to load and unload the fiber-laying machine from only one side. This allows the workpiece to be moved in and out of the fiber-laying machine in the manner of a blind alley. In a generally advantageous manner, it is possible to change a processed workpiece with an unprocessed workpiece simultaneously by means of the loading device.

In this case, the loading device is realized in a design of a detail of the disclosure as a rotation-reversing device which includes a rotatable bracket for receiving at least two workpieces.

In addition, the disclosure relates generally to a fiber-laying machine which is combined with an above-described loading device, by means of which it is possible to load and unload the fiber-laying machine from only one side. It is obvious that such a fiber-laying machine can also include each of the further features of afore-described fiber-laying machines.

In an embodiment, a laying head of the fiber-laying machine is movable in a perpendicular plane, wherein an angle between the plane and a loading path of the fiber-laying machine is between 0° and 30°. This allows the construction of a space-saving and in particular narrowly constructed fiber-laying machine. In an embodiment, the loading path and the plane, in this case, are angled by 0°, that is to say are arranged in parallel or on a line. In a generally advantageous manner, the laying head can only be moved in the perpendicular plane.

A loading path is to be understood in general as a section that extends in a particularly straight manner for the automated conveying of the workpiece between an outside region of the fiber-laying machine and a processing position of the workpiece. The loading path is consequently, on the one hand, part of the automated conveying device and, on the other hand, part of the fiber-laying machine.

In the case of a possible exemplary embodiment, a laying head of the fiber-laying machine is movable in a perpendicular plane, wherein a fiber spool storage unit of the fiber-laying device includes a plurality of fiber spools with spool axes which are parallel to one another, wherein an angle between the spool axes and the perpendicular plane is between 60° and 90°. On account of the arrangement of the fiber spool storage units and corresponding fiber guides, this also allows for a narrowly constructed fiber-laying machine. In an embodiment, the angle is approximately 90°. In this way, the loading path, the laying head and the fiber spool storage units can be arranged approximately in a line one behind another. At least two fiber spool storage units, which are each assigned to a group of fiber strands and are positioned side by side, are provided in particular.

The afore-described designs of the fiber-laying machine with reference to the alignment of the movement plane of the laying head, loading path and/or spool axes allow for extensive freedoms in the structural design and spatial dimensioning. This relates, in particular, to the arrangement of further components of the fiber-laying machine, in particular to an electric control unit and to an air conditioning unit.

In addition, the disclosure relates in general to a system for producing fiber composite components, including at least one first fiber laying machine for applying fiber laid scrims onto a workpiece; and
a further processing station, which is structurally identical or different, for modifying the workpiece;
wherein the workpiece is movable by means of an automated conveying device both to the fiber-laying machine and to the further processing station,
wherein the conveying device includes a loading device, by means of which it is possible to load and unload the fiber laid scrim system from only one side. In an embodiment, the loading device, in this case, in a design of a detail, is realized as a rotation-reversing means which includes a rotatable bracket for receiving at least two workpieces. Such a system is combinable with all the individual features of an above-described system. In particular, the fiber-laying machine can be an above-described fiber-laying machine.

An embodiment provides a fiber-laying machine for producing laid fiber scrims, including a tool table for feeding a workpiece along a feed direction; a laying head for applying fibers onto the workpiece; and a fiber-providing unit for feeding several fiber strands to the laying head; wherein the several fiber strands are combined on the laying head to form a fiber web which is to be applied onto the workpiece; wherein the laying head is movable relative to the fiber-providing unit in a laying direction; wherein a clamping device is arranged on the laying head for releasably clamping the fiber strands, wherein a portion of the fiber web is laid on the workpiece once the fiber strands have been pulled forward by a laying stroke such that while the fibers are being applied on the workpiece, no fibers are pulled out of the fiber-providing unit.

In various embodiments, the fiber-providing unit is arranged in a stationary manner, wherein in particular the laying head is movable relative to the fiber-providing unit only in precisely one plane.

In various embodiments, the clamping device is disengaged whilst the portion of the fiber web is laid.

In various embodiments, the clamping device includes at least one, in particular two pinch rollers which interact with one another.

In various embodiments, the laying head includes two feeds which run at an angle with respect to one another, wherein by means of a first of the feeds a first group of fiber strands and by means of the second of the feeds a second group of fiber strands are guided into an intersection region in order to combine the two groups of fiber strands to form the fiber web.

In various embodiments, the fibers are severable by means of a cutting device arranged on the laying head, wherein the cutting device includes a plurality of separately actuatable cutting members which can sever different parts of the fibers transversely with respect to the laying direction.

In various embodiments, the cutting device includes an actuator member for actuating at least one of the cutting members, wherein the actuator member is realized separately from the cutting member and is arranged in particular on an upper part of the laying head which can be removed for maintenance purposes.

In various embodiments, at least one pre-feed roller is provided on the laying head for the driven forward feed, wherein the pre-feed roller is arranged between the clamping device and an outlet-side compacting roller of the laying head.

In various embodiments, the fiber-laying device is constructed completely on a machine frame.

In various embodiments, the fiber laying machine includes a climatically closed housing.

In various embodiments, the workpiece is arranged on an automated conveyable pallet.

In various embodiments, a surface of the pallet carrying the workpiece slopes at an angle of less than 30 degrees in relation to a perpendicular.

In various embodiments, the laying direction runs in a plane which slopes at an angle of less than 30 degrees in relation to the perpendicular.

In various embodiments, the respective fiber strands are wound onto interchangeable spools, wherein the spools sit on rotational axes which are driven counter to an unwinding direction, wherein the drives of the rotational axes comprise a torque limitation means.

An embodiment provides a method for laying a fiber web on a workpiece, in particular by means of a device as described herein, said method including the steps of clamping the fibers to be laid in a clamping device of a laying head; moving the laying head into a start position relative to a fiber-providing unit, wherein the fibers are pulled out of the fiber-providing unit by a laying stroke; disengaging the clamping device; moving the laying head from the start position into an end position whilst laying the fibers on the workpiece such that whilst the fibers are being applied on the workpiece, no fibers are pulled out of the fiber-providing unit.

In various embodiments, the fibers are moved after disengaging the clamping device in relation to the laying head by means of a driven pre-feed roller, wherein the fibers are in particular not pulled out of the fiber-providing unit by means of the pre-feed roller.

An embodiment provides a system for producing fiber composite components, including at least one first fiber laying machine, in particular as described herein, for applying laid fiber scrims onto a workpiece; and a further processing station, different to the fiber-laying machine, for modifying the workpiece, wherein the workpiece is movable by means of an automated conveying device both to the fiber-laying machine and to the further processing station.

In various embodiments, the system includes a second fiber-laying machine which is in particular structurally identical to the first fiber-laying machine, is spatially separated from the first fiber-laying machine and is connected to the first fiber-laying machine by means of the automated conveying device.

In various embodiments, several fiber-laying machines are provided as parallel processing stations which carry out the same processing steps on simultaneously processed workpieces.

In various embodiments, several fiber-laying machines carry out different processing steps one after another on a workpiece as sequential processing stations.

In various embodiments, the system includes at least one buffer station for receiving, storing and forwarding several workpieces.

In various embodiments, the further processing station includes at least one item selected from the group of forming device, temperature chamber and/or painting device.

In various embodiments, the automated conveying device includes a loading device, by means of which it is possible to load and unload the fiber-laying machine from only one side.

In various embodiments, the loading device is realized as a rotation-reversing device which includes a rotatable bracket for receiving at least two workpieces.

In various embodiments, a laying head of the fiber-laying machine is movable in a perpendicular plane, wherein an angle between the perpendicular plane and a loading path of the fiber-laying machine is between 0° and 30°.

In various embodiments, a laying head of the fiber-laying machine is movable in a perpendicular plane, wherein a fiber spool storage unit of the fiber-laying machine includes a plurality of fiber spools with spool axes which are parallel with respect to one another, wherein an angle between the spool axes and the perpendicular plane is between 60° and 90°.

BRIEF DESCRIPTION OF THE DRAWINGS

Several exemplary embodiments are described below and are explained in more detail by way of the accompanying drawings, in which.

DETAILED DESCRIPTION

Figure 1:
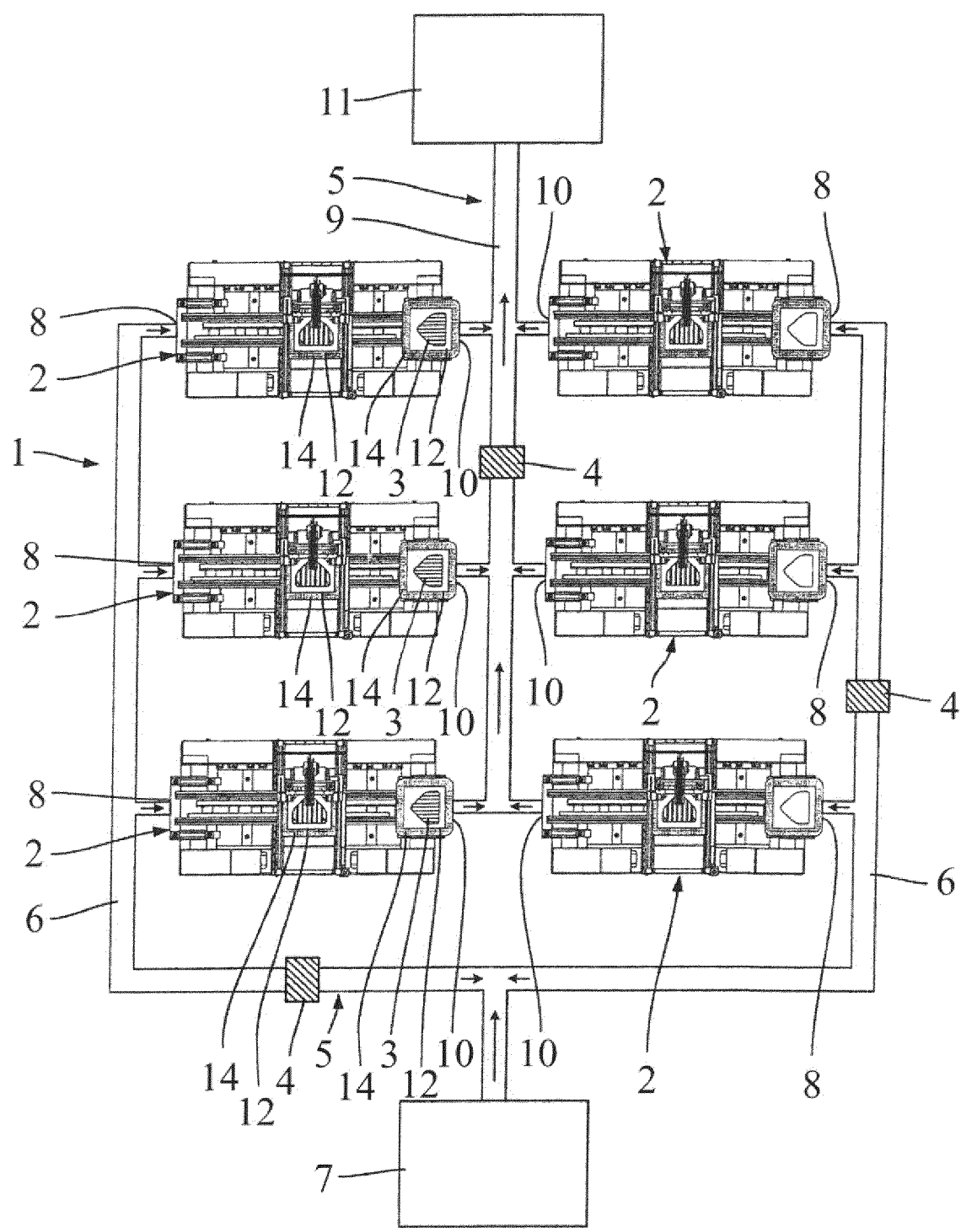
FIG. 1 shows a schematic representation of a system for producing fiber composite components according to a first exemplary embodiment with several fiber-laying machines for producing fiber laid scrims arranged parallel to one another.
Figure 2:
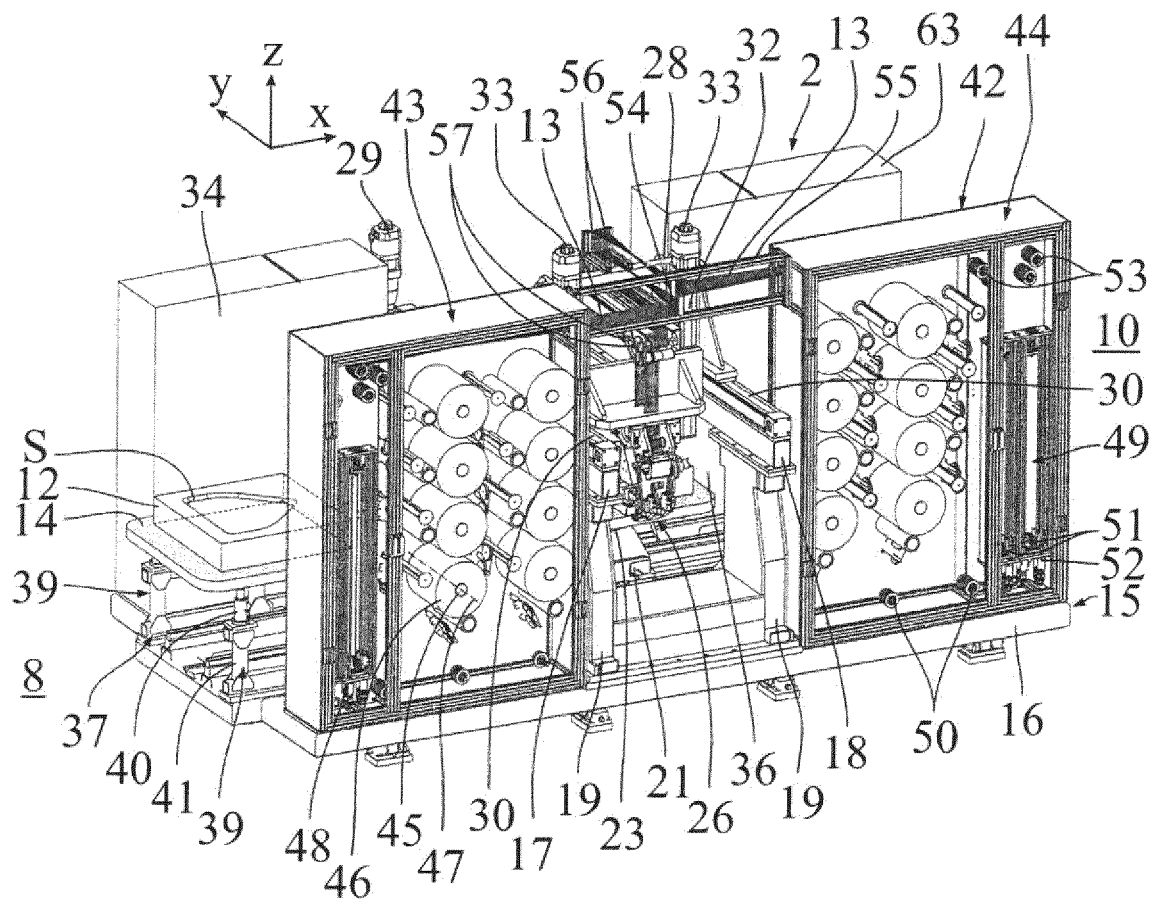
FIG. 2 shows a perspective view of a fiber-laying machine, in particular as part of the system shown in FIG. 1.

A first exemplary embodiment is described below by way of FIGS. 1 to 4. A system for producing fiber composite components 1, also called a fiber-laying installation below, comprises several fiber-laying machines 2 for producing fiber laid scrims 3. The fiber-laying machines 2 are structurally identical. In FIG. 1 the fiber-laying installation 1 comprises, for example, six structurally identical fiber-laying machines 2 which are arranged in two groups. Each group comprises three fiber-laying machines 2 which are arranged parallel to one another. For the automatic loading and unloading of the fiber-laying machines 2, the fiber-laying installation 1 comprises a conveying device 4, 5. The conveying device comprises, for example, several conveying carriages 4 which are movable along a guide 5. The guide 5 comprises a loading portion 6 which runs from a receiving point 7 to a respective loading end 8 of the fiber-laying machines 2.

At least one conveying carriage 4 is arranged so as to be movable on the loading portion 6. The guide 5 additionally comprises an unloading portion 9 which runs from a respective unloading end 10 of the fiber-laying machines 2 to a depositing point 11. At least one conveying carriage 4 is arranged so as to be movable on the unloading portion 9.

Workpieces 12, that is to say objects which are to be covered with fibers 13, are movable by means of the conveying device 4, 5 from the receiving point 7 to the loading ends 8 and workpieces 12 which have been covered with fibers 13 are movable from the unloading ends 10 to the depositing point 11.

The workpieces 12 are arranged on pallets 14. The fiber-laying machines 2 are structurally identical such that simply one of the fiber-laying machines 2 is described below.

The fiber-laying machine 2 comprises a machine frame 15 with a machine bed 16 and cross members 17, 18 arranged thereon. The machine bed 16 extends substantially in a horizontal x direction and a horizontal y direction which runs perpendicular thereto. The cross members 17, 18 run parallel to they direction and are arranged on the machine bed 16 spaced apart in the x direction. The cross members 17, 18 are arranged above the machine bed 16 in a z direction in each case at both ends by means of longitudinal connecting pieces 19. The z direction runs perpendicular to the x and the y direction such that the x, y and z direction form a Cartesian coordinate system.

Two x guide rails 20, which extend in the x direction and are spaced apart from one another in the y direction, are arranged on the machine bed 16. An x carriage 21, which is movable by means of an x drive motor 22 along the x direction between the loading end 8 and the unloading end 10, is mounted on the x guide rails 20. To this end, the x guide rails 20 extend in the x direction along the entire machine bed 16. A tool table 23, which is pivotable about a vertical pivot axis 25 by means of a c drive motor 24, is arranged on the x carriage 21. The vertical pivot axis 25 is also designated as c axis. The c axis 25 runs parallel to the z direction.

The tool table 23 is movable linearly exclusively in the x direction by means of the X carriage 21. The tool table 23 serves for positioning the respective workpiece 12 relative to a fiber-laying head 26 (called laying head below). For mechanically clamping and releasing the pallets 14 with the respective workpiece 12, the tool table 23 comprises several clamping units 27. The clamping units 27 are shown schematically in FIG. 3. The clamping units 27 are known in principle and are realized, for example, as zero-point clampers 15. The clamping units 27 are actuatable electro-mechanically, hydraulically or pneumatically. For laying fibers 13 onto a two-dimensional or three-dimensional surface S of the respective workpiece 12, the laying head 26 is positionable above the tool table 23 in the z direction.

The laying head 26 is movable along they direction and along the z direction. A y carriage 28, which is movable linearly along the y direction by means of a y drive motor 29, is mounted on the cross members 17, 18 for this purpose. The y carriage 28 is mounted on y guide rails 30 which are arranged on a surface of the cross members 17, 18. The y carriage 28 extends between the cross members 17, 18. For moving the laying head 26 in the z direction, a z carriage 31 is arranged on the y carriage 28. The z carriage 31 is mounted on z guide rails 32 and is movable along the z direction by means of z drive motors 33. The z guide rails 32 run parallel to the z direction and are spaced apart from one another in the x direction.

The laying head 26 is arranged on the z carriage 31. The laying head 26 can be fastened so as to be exchangeable. The laying head 26 is movable linearly exclusively in the y direction. It is not possible to pivot the laying head 26 on the z carriage 31.

In the case of an alternative embodiment which is not shown, in addition to this or as an alternative to it, the laying head 26 can be pivotable about a pivot axis which runs parallel to the x direction, that is to say can realize an a axis. Comparatively strongly curved, three-dimensional fiber laid scrims 3 can be produced as a result.

The laying head 26 is linearly movable along the z direction by means of the z carriage 31 by at least 200 mm, in particular by at least 400 mm, and in a manner by at least 600 mm. To produce three-dimensional fiber laid scrims 3, a control unit 34 of the fiber-laying machine 2 is realized in such a manner that the fiber-laying head 26 is linearly movable by means of its stroke by at least 50 mm, in particular by at least 100 mm, and in particular by at least 150 mm by means of the z carriage 31 whilst the fibers 13 are being laid.

To move the tool table 23 along the x direction, through-openings 35, 36 for the tool table 23 are realized beneath the cross members 17, 18 and between the respectively associated longitudinal connecting pieces 19. For automatically loading the tool table 23 with pallets 14, a first pallet handling unit 37 is arranged on the loading end 8, whereas for automatically unloading mold pallets 14 from the tool table 23, a second pallet handling unit 38 is arranged on the unloading end 10. The handling units 37, 38 are fastened at their ends on the machine bed 16 along the x direction. The pallet handling units 37, 38 are realized as lifting units which serve for raising and lowering pallets 14.

To this end, the pallet handling units 37, 38 comprise at least three, in particular at least four lifting elements 39. The lifting elements 39 comprise a piston 40 which is displaceable along the z direction in an associated cylinder 41. The lifting elements 39 are actuatable electromechanically, pneumatically or hydraulically. In particular, the lifting elements 39 associated with the respective pallet handling unit 37, 38 are actuated synchronously by means of the control unit 34 in order to raise or lower a mold pallet 14.

The fiber-laying machine 2 comprises a fiber-providing unit 42 for providing the fibers 13 to be laid. The fiber-providing unit 42 comprises two fiber spool storage units 43, 44, a first fiber spool storage unit 43 being arranged in the x direction next to the first cross-member 17 and a second fiber spool storage unit 44 being arranged next to the second cross-member 18. The fiber spool storage units 43, 44 are fastened on their ends on the machine bed 16 in the y direction. The fiber spool storage units 43, 44 each comprise several fiber spool holders 45 for fiber spools 46. The fiber spools 46 are arranged on a respective fiber spool holder 45 and are mounted so as to be rotatable about a respective horizontal rotational axis 47. The respective horizontal rotational axis 47 runs parallel to the y direction.

The fibers 13, in each case in the form of a fiber strand, are guided from the fiber spools to the laying head 26. At the laying head, the individual fiber strands are run together and homogenized to form a fiber web before the fiber web is applied to the workpiece.

The rotational axes 47 of the fiber spool holders are provided with a drive in the present case such that the spools sit on axes 47 which are driven counter to an unwinding direction, the drives of the axes 47 comprising a torque limiting means. The torque limiting means can, for example, be effected by means of a friction clutch or also by torque-dependent actuation of an electric drive. In this way, the respective fiber strand can be held at a defined pretension, where required, in particular during unwinding.

The fibers or fiber strands 13 are feedable by means of guide elements 50 in the form of guide rollers to a respective dancer hopper 48, 49, which serves for compensating for changes in tensile stress acting on the fibers 13. The respective dancer hopper 48, 49 comprises deflecting elements 51 in the form of deflecting rollers which are displaceable along the z direction and pre-stress the fibers 13 by means of weights. The deflecting elements 51 are also designated as dancers. As a result of displacing the deflecting elements 51, it is possible to compensate for dynamic effects which, on the one hand, are produced by the inertia of the fiber spools 46 and, on the other hand, are caused by fibers 13 being conveyed irregularly in the event of individual fibers 13 being cut when the fibers 13 are deposited. The fibers 13 are deflectable via guide elements 53 in the form of guide rollers and are guidable out of the respective fiber spool storage unit 43, 44. The position of the deflecting elements 51 is controlled in the operation of the dancer hoppers 48, 49. Sensors 52, which determine the deflection in the z direction of the deflecting elements 51, serve for this purpose. The deflection in the z direction is controlled by a required position by the fiber spool holder 45 being provided with a controllable brake. In an embodiment, the brake is a torque-limited drive which acts counter to the winding direction.

The fibers 13 emerge from the fiber spool storage units 43, 44 in the x direction and are deflected into the y direction by vertically arranged deflecting elements 54, which realize a vertical deflection axis. The deflecting elements 54 are realized as deflecting rollers. The deflecting elements 54 are mounted on a support frame 55 which is fastened between the fiber spool storage units 43, 44. Horizontal deflecting elements 56, which are in the form of deflecting rollers and deflect the fibers 13 initially from the y direction into the z direction and then from the z direction back into the y direction, are arranged on a side of they carriage 28 facing away from the laying head 26 and the fiber spool storage units 43, 44. The deflecting elements 56 realize horizontal deflection axes. Further horizontal deflecting elements 57 are arranged between they carriage 28 and the fiber spool storage units 43, 44 above the z carriage 31. The deflecting elements 57 realize horizontal deflection axes and deflect the fibers 13 from the y direction into the z direction to the laying head 26. The deflecting elements 57 are realized as deflecting rollers.

Figure 3:
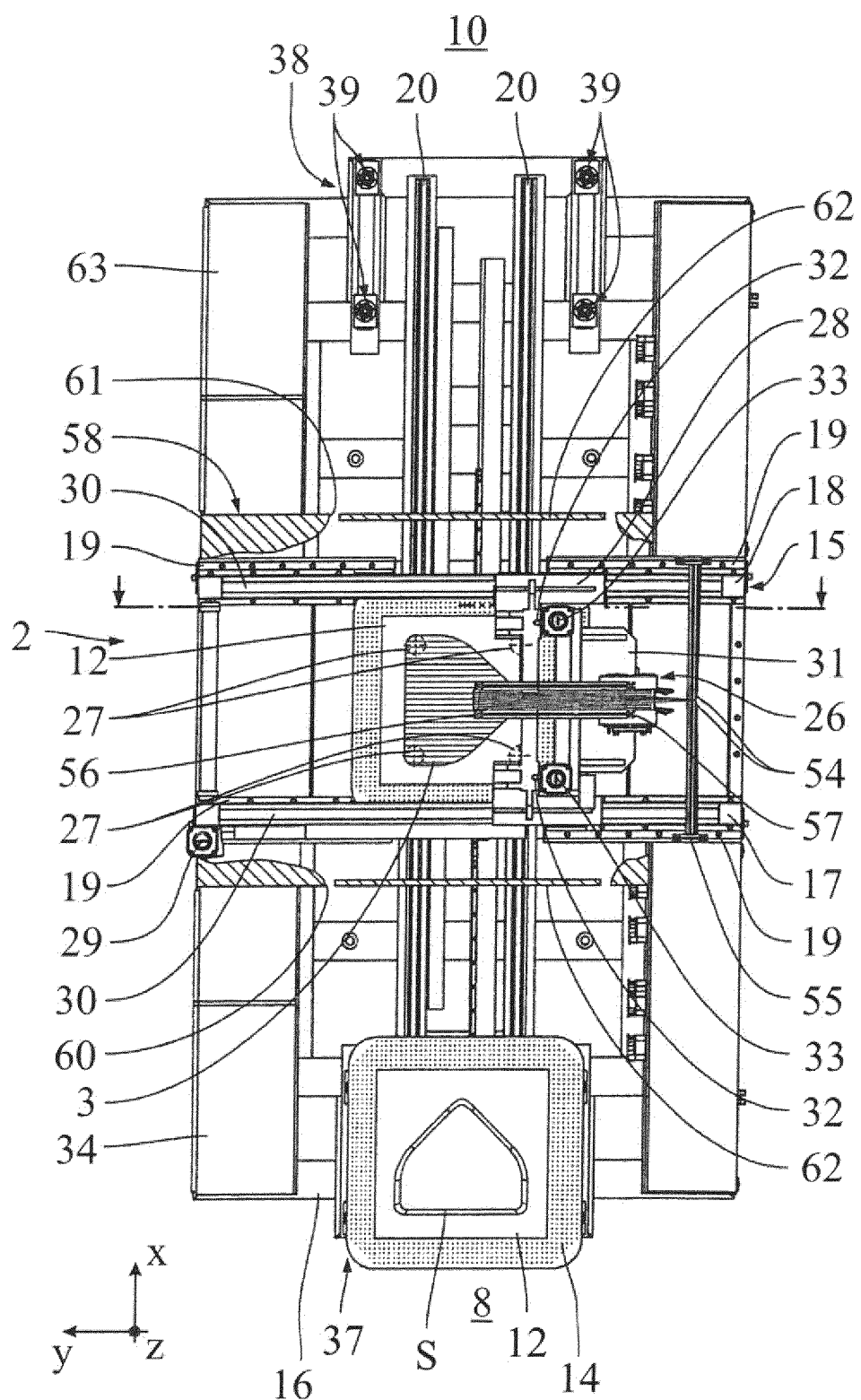
FIG. 3 shows a top view of the fiber-laying machine from FIG. 2.
Figure 4:
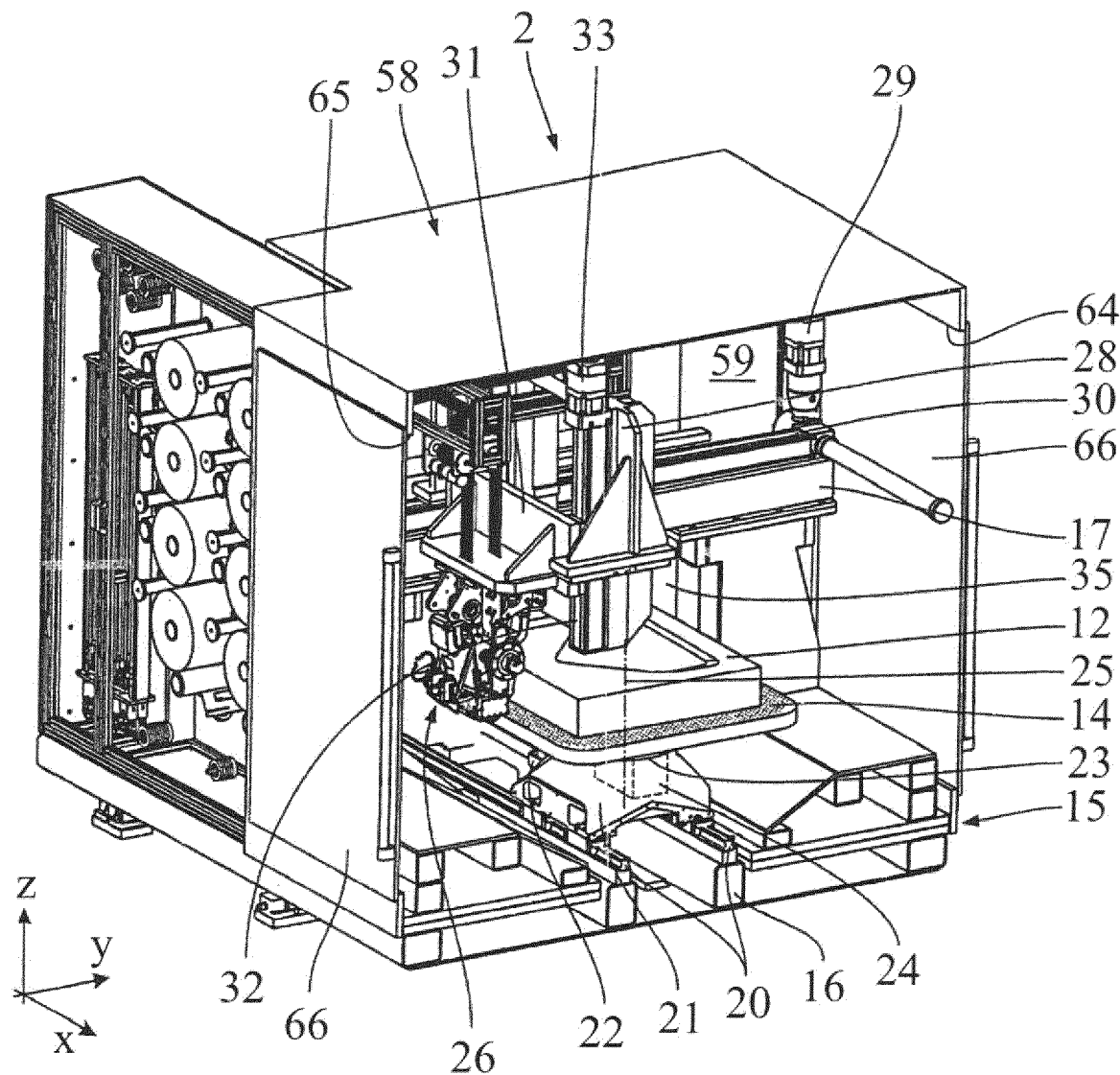
FIG. 4 shows a perspective sectional representation through the fiber-laying machine from FIG. 3 along the cutting line IV-IV.

The fiber-laying machine 2 comprises a machine housing 58 which is only shown in FIGS. 3 and 4. The machine housing 58 delimits an interior 59, in which the longitudinal connecting pieces 19 are arranged with the cross members 17, 18, the y carriage 28, the z carriage 31 and the fiber-laying head 26. The machine housing 58 comprises a first housing opening 60 toward the loading end 8 and a second housing opening 61 toward the unloading end 10, both of which can be sealingly closed and opened by respective cover elements 62. The housing openings 60, 61 and the associated cover elements 62 are simply outlined in FIG. 3. The cover elements 62 are realized, for example, as doors or segmented aprons.

For air conditioning the interior 59, the fiber-laying machine 2 comprises an air-conditioning unit 63 which is arranged on the machine 16 bed. All in all, a climatically closed housing 58 in the sense of the disclosure is realized as a result.

Two further housing openings 64, 65, which open out into the interior 59 between the respectively adjacent longitudinal connecting pieces 19, are realized in the machine housing 58 to provide an entrance into the interior 59. The housing openings 64, 65 are closable by means of doors 66.

The method of operation of the system for producing fiber composite components 1 and of the fiber-laying machine 2 is as follows:

The fiber-laying machines 2 are automatically loaded with pallets 14, on which workpieces 12 to be covered are arranged, by means of the conveying device 4, 5. To this end, the at least one conveying carriage 4 moves from the receiving point 7 on the loading portion 6 of the guide 5 to the respective loading end 8 of the fiber-laying machines 2.

Loading is effected in such a manner that the conveying device 4, 5 supplies the pallet 14 to the first pallet handling unit 37. The first pallet handling unit 37 can be situated in a raised position. If the first pallet handling unit 37 is not in the raised position, it is transferred into a raised position prior to or after loading. The respective fiber-laying machine 2 is loaded parallel in time with the laying of fibers 13 and/or with the unloading of the tool table 23.

Whilst the first pallet handling unit 37 provides a workpiece 12 to be covered at the loading end 8, a laid fiber scrim 3 is produced by means of the laying head 26. To this end, a pallet 14 with a workpiece 12 arranged thereon is clamped on the tool table 23 by means of the clamping units 27. The tool table 23 is moved linearly by means of the x carriage 21 along the x direction during the fiber laying and to achieve a desired fiber orientation is pivoted by means of the c drive motor 24 about the pivot axis 25. In addition, during the fiber laying the laying head 26 moves along the y direction by means of the y carriage 28 and along the z direction by means of the z carriage 31.

As a result of moving the laying head 26 in the z direction, a three-dimensional laid fiber scrim 3 can also be produced where required.

Once the laid fiber scrim 3 has been completed, the x carriage 21 is moved in the x direction to the unloading end 10. There, the second pallet handling unit 38 is situated in a lowered position. For automatically unloading the pallet 14, said pallet is disengaged from the tool table 23 by means of the clamping units 27. The lifting elements 39 of the second pallet handling unit 38 are then transferred from the lowered position into the raised position such that the pallet 14 with the completely covered workpiece 12 is automatically unloaded from the tool table 23.

The x carriage 21 then moves from the unloading end 10 to the loading end 8, where the first pallet handling unit 37 in the raised position holds the next pallet 14 ready. If the tool table 23 is situated beneath the pallet 14, the lifting elements 39 of the first pallet handling unit 37 are transferred from the raised position into the lowered position, as a result of which the pallet 14 is arranged on the tool table 23. The pallet 14 is then clamped on the tool table 23 by means of the clamping units 27. The tool table 23 is then moved in the x direction to the laying head 26 for the next fiber laying operation such that said laying head can begin the new fiber laying operation.

The lifting elements 39 of the first pallet handling unit 37 are transferred into the raised position again for another loading. The automatic unloading of the fiber-laying machines 2 is effected by means of the conveying device 4, 5 which runs from the respective unloading end 10 to the depositing point 11. The unloading of the respective fiber-laying machine 2 is effected parallel in time with the loading of the tool table 23 with a pallet 14 and a workpiece 12 to be covered arranged thereon and/or with the covering of the workpiece 12 with fibers 13. For unloading, the conveying carriage 4 takes the pallet 14 and the workpiece 12 arranged thereon from the second pallet handling unit 38 and moves from the respective unloading end 10 to the unloading portion 9 of the guide 5 to the depositing point 11. The lifting elements 39 of the second pallet handling unit 38 are transferred into the lowered position after unloading such that the tool table 23 is able to be unloaded again.

The housing openings 60, 61 of the air-conditioned machine housing 58 are closed predominantly by means of cover elements 62 and are only opened when the tool table 23 is moved from the loading end 8 to the laying head 26 or from the laying head 26 to the unloading end 10 or from the unloading end 10 to the loading end 8.

The laying of fibers 13 is effected unidirectionally when the laying head 26 is moved in the y direction toward the fiber spool storage units 43, 44. In the case of said movement operation, the distance between the vertical deflecting elements 54 and the horizontal deflecting elements 56 is shortened such that during the fiber laying operation no fibers 13 have to be pulled out of the fiber spool storage units 43, 44. As a result, fiber laying can be effected comparatively rapidly. When moving the fiber-laying head 26 rearward away from the fiber spool storage units 43, 44, the fibers 13 are then pulled out of the fiber spool storage units 43, 44 for the next fiber laying operation. Changes in the tensile stress of the fibers 13 are compensated for by means of the dancer hoppers 48, 49.

A second exemplary embodiment is described below by way of FIG. 5. In contrast to the first exemplary embodiment, the fiber laying machines 2 are arranged together in rows in two groups. The guide 5 is realized in such a manner that the conveying carriages 4 are movable over a respective loading portion 6 and a respective unloading portion 9 to the loading end 8 and the unloading end 10 of each of the fiber-laying machines 2. The fiber spool storage units 43, 44 of the respective fiber-laying machines 2 are arranged toward a space 67. The space 67 is formed by the two rows of fiber-laying machines 2. A supply of fiber spools 46 is arranged, for example, in the space 67 in order to restock the fiber spool storage unit 43, 44. With regard to the further design and to the further method of operation of the system 1 and of the fiber-laying machines 2, reference is made to the preceding exemplary embodiment.

Generally speaking, the following applies: The fiber-laying machines 2 enable the laying of fiber stacks produced from tow-preg material and/or slit-tow material and/or dry fibers 13 which can be provided with a binder. In all exemplary embodiments, the fibers 13 can be already pre-coated with a binding agent in the sense of the disclosure in the fiber-providing unit.

The fibers 13 can be carbon fibers and/or glass fibers.

The laid fiber scrims 3 can be produced with an arbitrary fiber orientation and/or contour. The fiber-laying machines 2 operate independently.

For loading and unloading the fiber-laying machines 2, the system for producing fiber composite parts can comprise a super-ordinated control device. The fiber-laying machines 2 are in particular integrated into an assembly line for achieving a high level of productivity. The respective fiber-laying machine 2 is realized in a manner with four axes.

If the fiber-laying head 26 is realized so as to be pivotable about an additional a axis (not shown), the respective fiber-laying machine 2 is realized with five axes.

Both two-dimensional and three-dimensional laid fiber scrims 3 can be produced using the respective fiber-laying machine 2. The laying head 26 is movable in a linear manner in two axes. In particular, the laying head 26 is movable in a linear manner exclusively in two axes, namely in a horizontal y axis and a vertical z axis. The movement of the laying head is consequently effected in precisely one plane which is spanned here by the y axis and by the z axis.

The tool table 23 is movable in a linear manner in an axis and is pivotable about the pivot axis 25. In particular, the tool table 23 is movable in a linear manner exclusively in an x axis and is pivotable about a vertical z axis 25. Said axis combination allows for simple, flexible and efficient production of two-dimensional and three-dimensional laid fiber scrims 3 with arbitrary fiber orientation and/or contour.

The loading of the fiber-laying machine 2 and/or of the tool table 23 is effected automatically. The conveying device 4, 5 and the pallet handling unit 37 are provided for this purpose.

Correspondingly, the unloading of the tool table 23 and/or of the fiber-laying machine 2 is effected automatically. The pallet handling unit 38 and the conveying device 4, 5 are provided for this purpose. The conveying device can also be realized in such a manner that the workpieces 12 or the pallets 14 are movable by means of the guide itself. The guide realizes, for example, a roller conveyor or a belt conveyor for this purpose.

Conveyor carriages are then not necessary. The pallet handling units 37, 38 are, for example, a pallet changer. The fiber-laying machine 2 is accessible from two oppositely situated ends for loading and unloading. In particular, pallets 14 can be fully charged by the fiber-laying machine 2. As a result of the conveying device 4, 5, the fiber-laying machine 2 is suitable to be integrated into assembly lines.

Laid fiber scrims 3 with a size of 1500 mm×1500 mm×100 mm can be produced, for example, using the fiber-laying machine 2. Such laid fiber scrims 3 are used, for example, in the automobile industry. The disclosure is not restricted to laid fiber scrims of the size named as an example.

Figure 6:
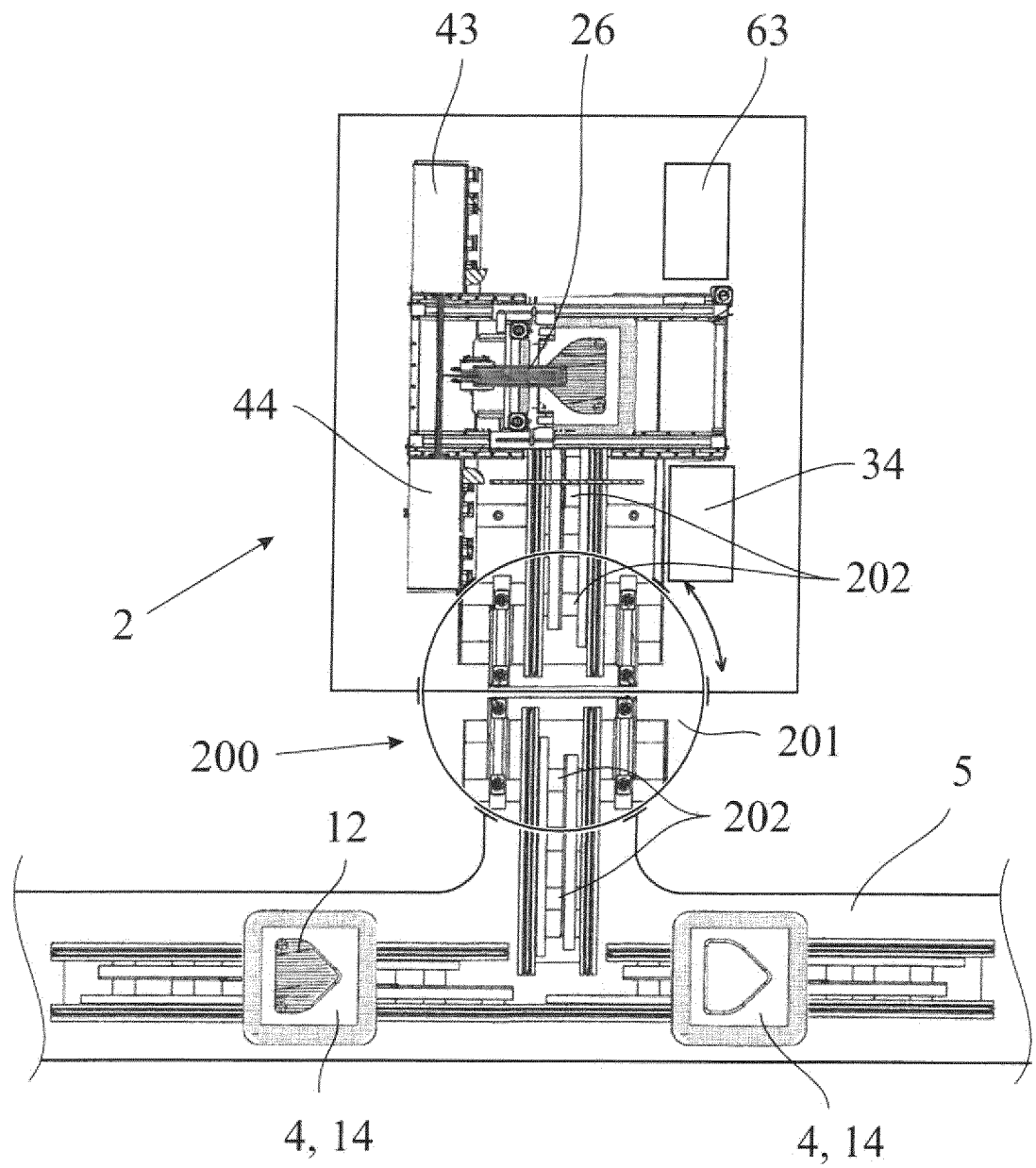
FIG. 6 shows a further embodiment, where a one-sided loading device is provided for a fiber-laying machine.
Figure 7:
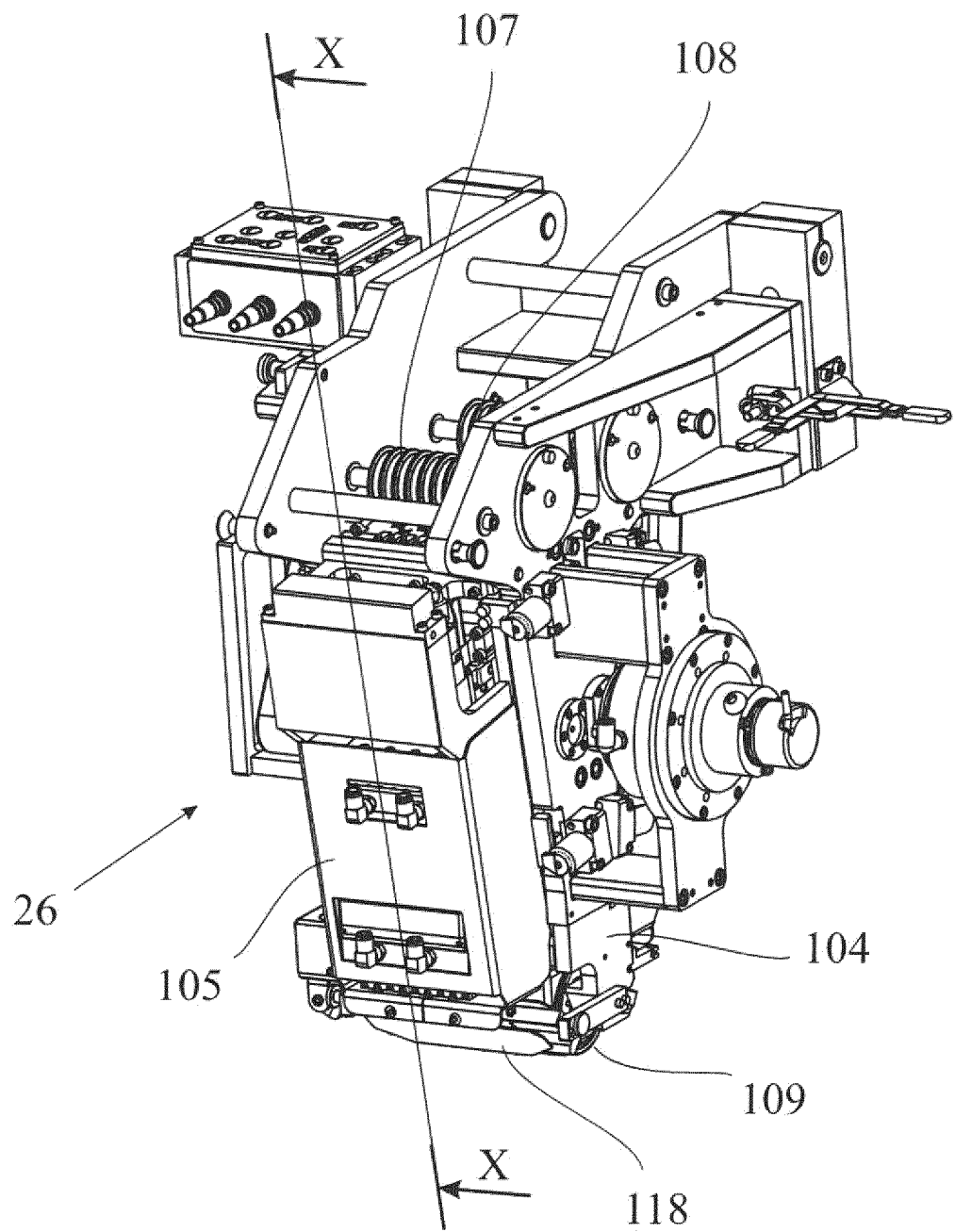
FIG. 7 shows a spatial view of a laying head according to the fiber-laying machine from FIG. 2.

In the case of an embodiment according to FIG. 6, a fiber-laying machine is connected by means of a loading device 200 to the automated conveying device 4, 5, by means of which it is possible to load and unload the fiber-laying installation from only one end. The loading device 200 forms, in this case, a T-shaped branch in the conveying device 4, 5 such that a pallet 14 with the workpiece 12 can be moved from the branch into the fiber-laying machine and out again in the manner of a blind alley.

In this case, conveying is effected between an outer part of the conveying device 4, 5 and a processing position in the fiber-laying machine via a loading path 202 which runs at least in part inside the fiber-laying machine. The technical realization of the loading path 202, for example, can correspond to the afore-described guide of the tool table along the x axis. In the present case, the loading path 202 branches off from the conveying device 4, 5 at a right angle, however other angles can also be provided. The loading path 202, in the case of a general embodiment, can also be arranged as a linear continuation of an outer part of the conveying device.

The loading device 200 is realized in detail as a rotation-changing device which includes a rotatable bracket 201 for receiving at least two workpieces 12. The workpieces 12, in this case, are in each case arranged on their pallet 14. The rotatable bracket 201 is rotatable in a substantially horizontal plane in the manner of a rotary turntable. In this case, to increase the throughput, the rotatable bracket can be loaded at the same time with a non-processed workpiece 12 by the outer conveying device 4, 5 and with a processed workpiece out of the fiber-laying machine. The bracket is then turned by 180 degrees. The processed workpiece can then be transported further with the conveying device 4, 5, and the unprocessed workpiece can be moved into the fiber-laying machine 2 via the loading path 202.

It is obvious that the rotatable bracket, depending on requirements, can also be present in combination with a fiber-laying machine 2 which can be charged at both ends, as described above and shown in FIG. 1 to FIG. 5.

The fiber-laying machine shown in FIG. 6 includes, as described above with regard to FIG. 2 to FIG. 4, the laying head 26 which is movable in precisely one, perpendicularly arranged plane. The laying head 26 is supplied by two fiber spool storage units 43, 44. The electric control unit 34 and the air-conditioning unit 63 are shown schematically in their position as further components. In the present case, the loading path 202 runs at a right angle of 90° to the perpendicularly arranged plane of the movement of the laying head. The spool axes or rotational axes of the fiber spools 47 run parallel to the perpendicularly arranged plane.

Figure 11:
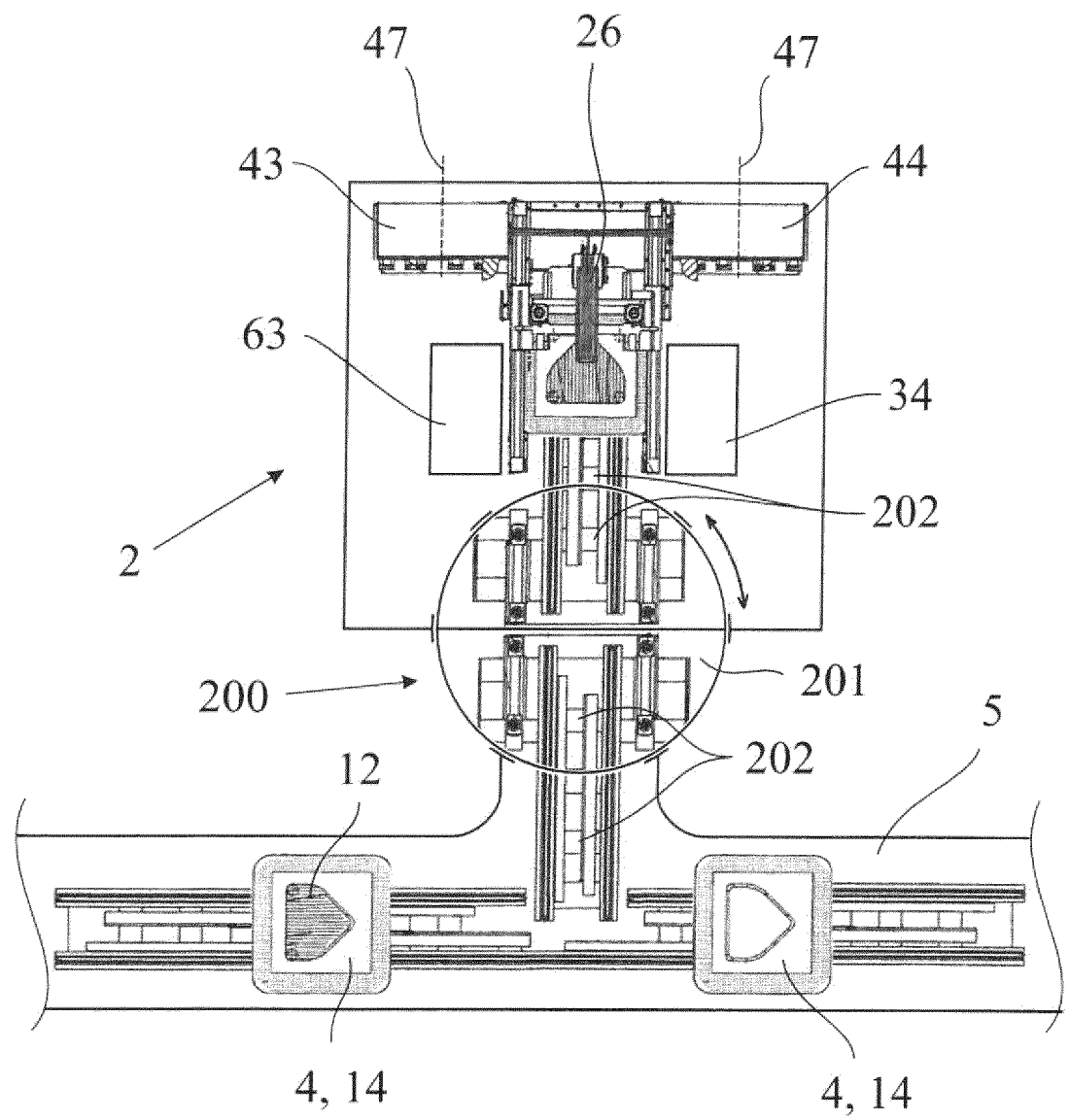
FIG. 11 shows a first modification of the embodiment from FIG. 6.

In the case of the first modification shown in FIG. 11, the tool table has been modified such that the loading path 202 runs parallel to the perpendicularly arranged plane in which the laying head 26 is moved. In particular, a central axis of the loading path 202 runs in the perpendicularly arranged plane. The arrangement of the fiber spool storage units 43, 44 and of the control unit 34 and of the air-conditioning unit 63 have correspondingly remained the same relative to the laying head, but together with the laying head have been turned by 90° relative to the automated conveying device 4, 5.

Figure 12:
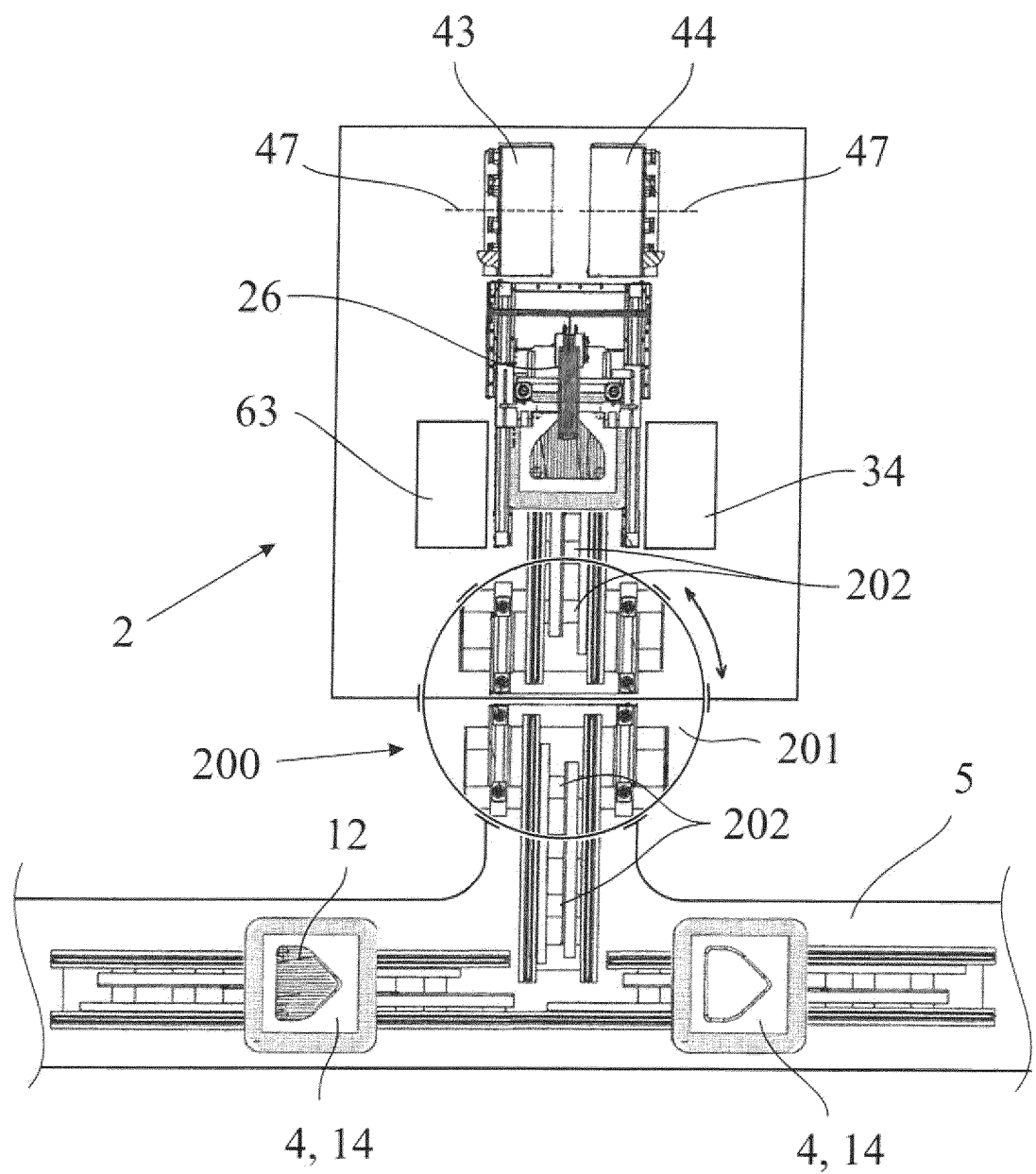
FIG. 12 shows a second modification of the embodiment from FIG. 6.

In the case of the second modification shown in FIG. 12, in addition to the changes in FIG. 11, the fiber spool storage units 43, 44 have been turned by 90° relative to the laying head 26. As a result, the spool axes 47 now run at an angle of 90° to the perpendicularly arranged plane. Correspondingly, the fiber spool storage units 43, 44 can be arranged substantially in a line with the laying head 26 and with the loading path 202. This allows for a particularly narrow design of the fiber-laying machine 2.

Generally speaking, the named components of the fiber-laying machine, namely the several fiber spool storage units 43, 44, the air-conditioning unit 63 and the electric control unit 34, can be arranged in an arbitrary manner relative to the laying head 26 and/or to the loading path 202. As a result, an outer dimension, an outline shape, the position of a service access or the like for the fiber-laying machine 2 can be adapted to a respective requirement.

In the case of the system shown in FIG. 1 to FIG. 6, the fiber-laying machines 2 are combined in a manner for modifying the workpiece 12 with at least one further processing station (not shown) which is different from the above-described fiber-laying machine 2. In this case, this can be both a differently designed fiber-laying machine and a processing station which is not realized for laying fibers on the workpiece. The further processing station, in this case, is connected to the fiber-laying machine 2 by means of the automated conveying device 4, 5.

In particular, the further processing station can be a forming device, in particular a pressing device, by means of which the workpiece 12 is formed or pressed in an operating step following the applying of fibers 13.

As an alternative to this or in addition to it, the further processing station is a temperature chamber and/or a painting device. It can also be another processing station which is used, in particular, for automated production of aircraft components or of automobile components.

In the case of the embodiment shown in FIG. 1 as an example, parallel processing of several workpieces 12 on their respective pallets 14 is favored in particular. In this case, the system includes several structurally identical fiber-laying machines 2 which are spatially separated from one another and are connected by means of the automated conveying device 4, 5. The modifications undertaken on the workpieces 12, in this case, are in each case identical.

Figure 5:
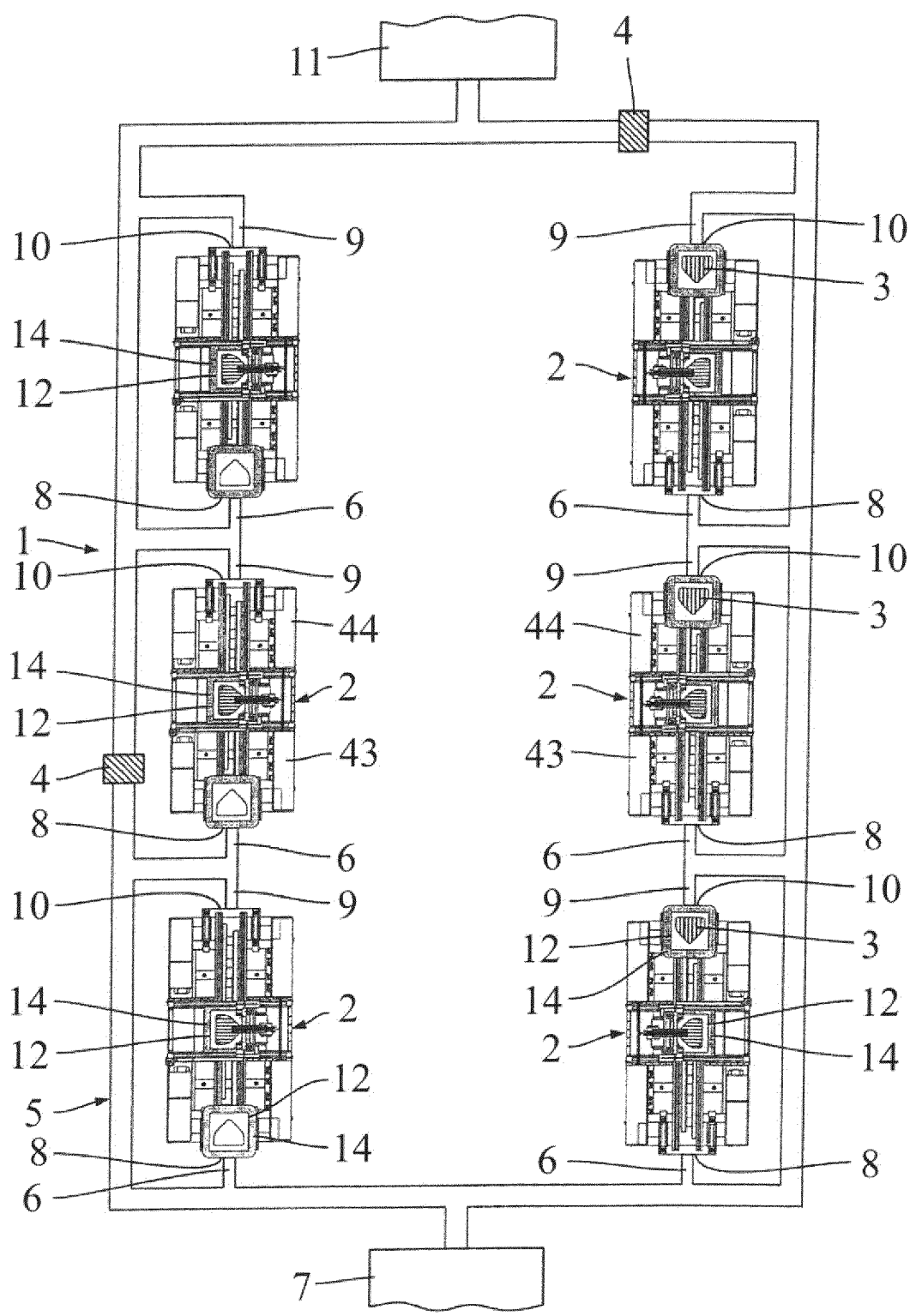
FIG. 5 shows a schematic representation of a system for producing fiber composite components according to a second exemplary embodiment with fiber-laying machines for producing fiber laid scrims arranged in rows with respect to one another.

In the case of the embodiment shown as an example in FIG. 5, favored in particular is that several fiber-laying machines 2 carry out different processing steps one after another on a workpiece 12 as sequential processing stations. The shown arrangement can be operated by controlling the conveying device 4, 5 in a suitable manner, for example as two parallel rows, arranged sequentially one after another, of in each case three fiber-laying machines 2 arranged between the removal point 7 and the depositing point 11. In a respective row, three different processing steps can then be carried out one after another on the same workpiece 12. To this end, differently designed fiber-laying machines can also be arranged in the respective row. A combination with a processing station that is different from a fiber-laying machine in a row is also possible.

The removal point 7 and/or the depositing point 11 can each be realized as a buffer station for receiving, storing and forwarding several workpieces 12. In this way, the buffer stations 11, 12 form an intermediate storage unit for the workpieces 12 on their palettes 14, as a result of which integration into an automated overall production system with corresponding assembly lines is improved A laying head 26, which is used in an above-described fiber-laying machine, is explained in more detail below.

The laying head 26 is arranged on the further fiber-laying machine 2 as an exchangeable module. As described above, the laying head 26 can be moved in the y direction, also called the laying direction below. In addition, the laying head 26 can be moved in the z direction perpendicular thereto in order to be set on the workpiece or raised from said workpiece. All in all, the laying head 26 is consequently moved in precisely one plane which is spanned by the y axis and the z axis.

The laying head has two feeds 101, 102 which run at an angle with respect to one another, wherein by means of the first 101 of the feeds a first group of fiber strands 13 and by means of the second 102 of the feeds a second group of fiber strands are guided into an intersection region 103 in order to combine the two groups of fiber strands 13 to form a fiber web. In the present case, each group includes eight fiber strands such that all in all 16 fiber strands 13 are combined to form a fiber web.

Figure 8:
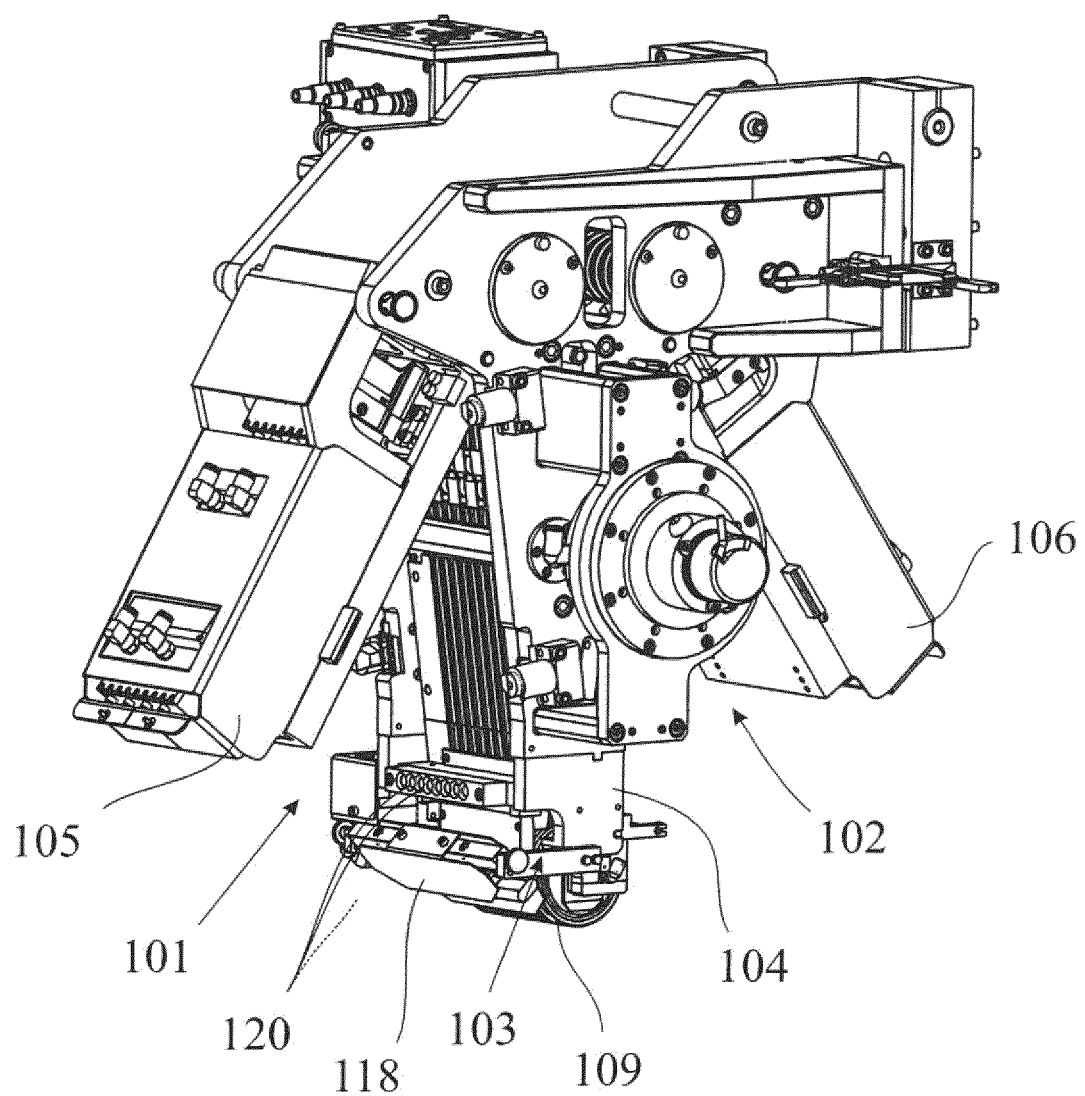
FIG. 8 shows the laying head from FIG. 7 in a position opened for maintenance purposes.
Figure 9:
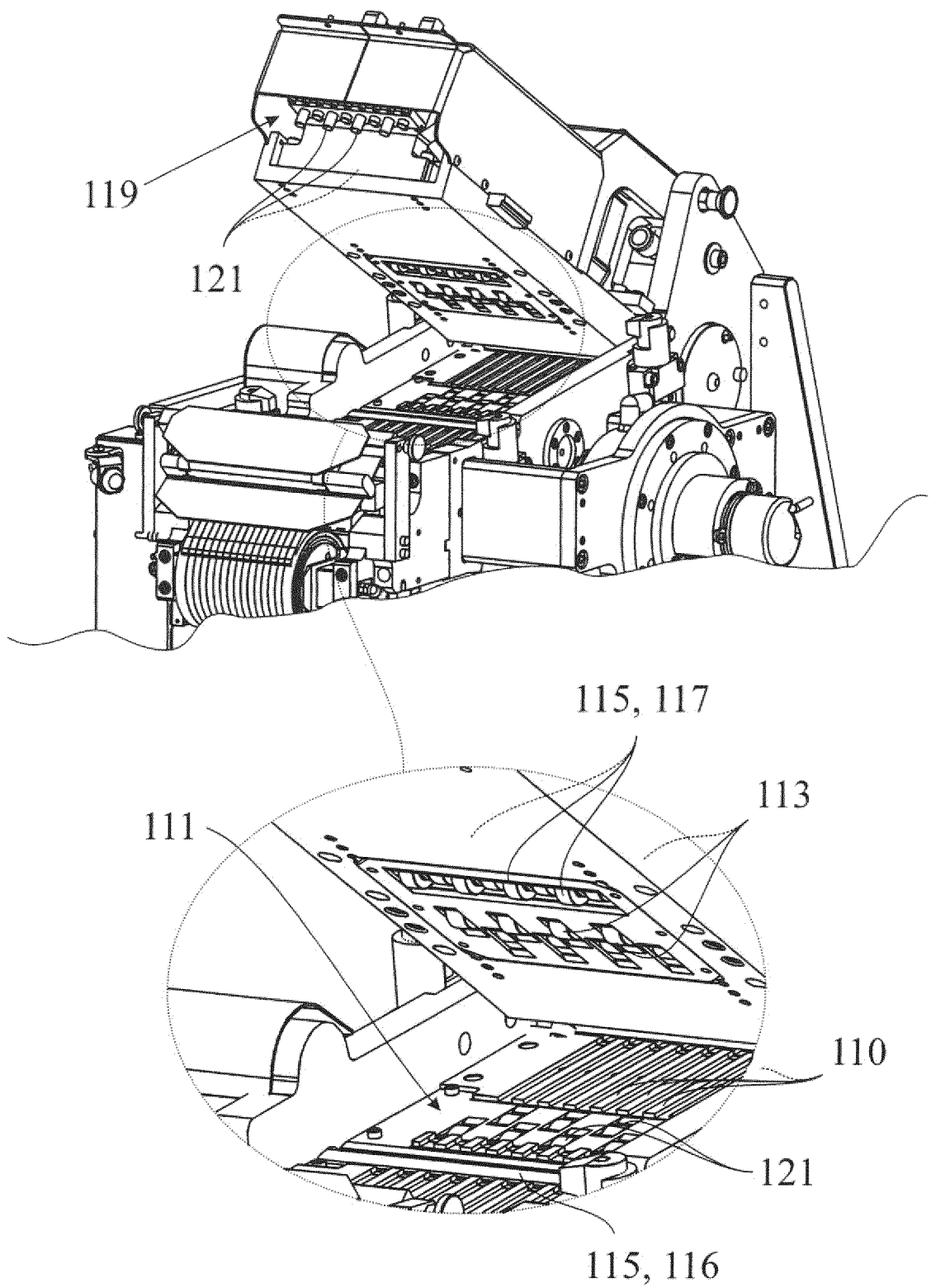
FIG. 9 shows the laying head from FIG. 8 from another perspective and FIG. 10 shows a sectional view through the laying head from FIG. 7 along the cutting line X-X.
Figure 10:
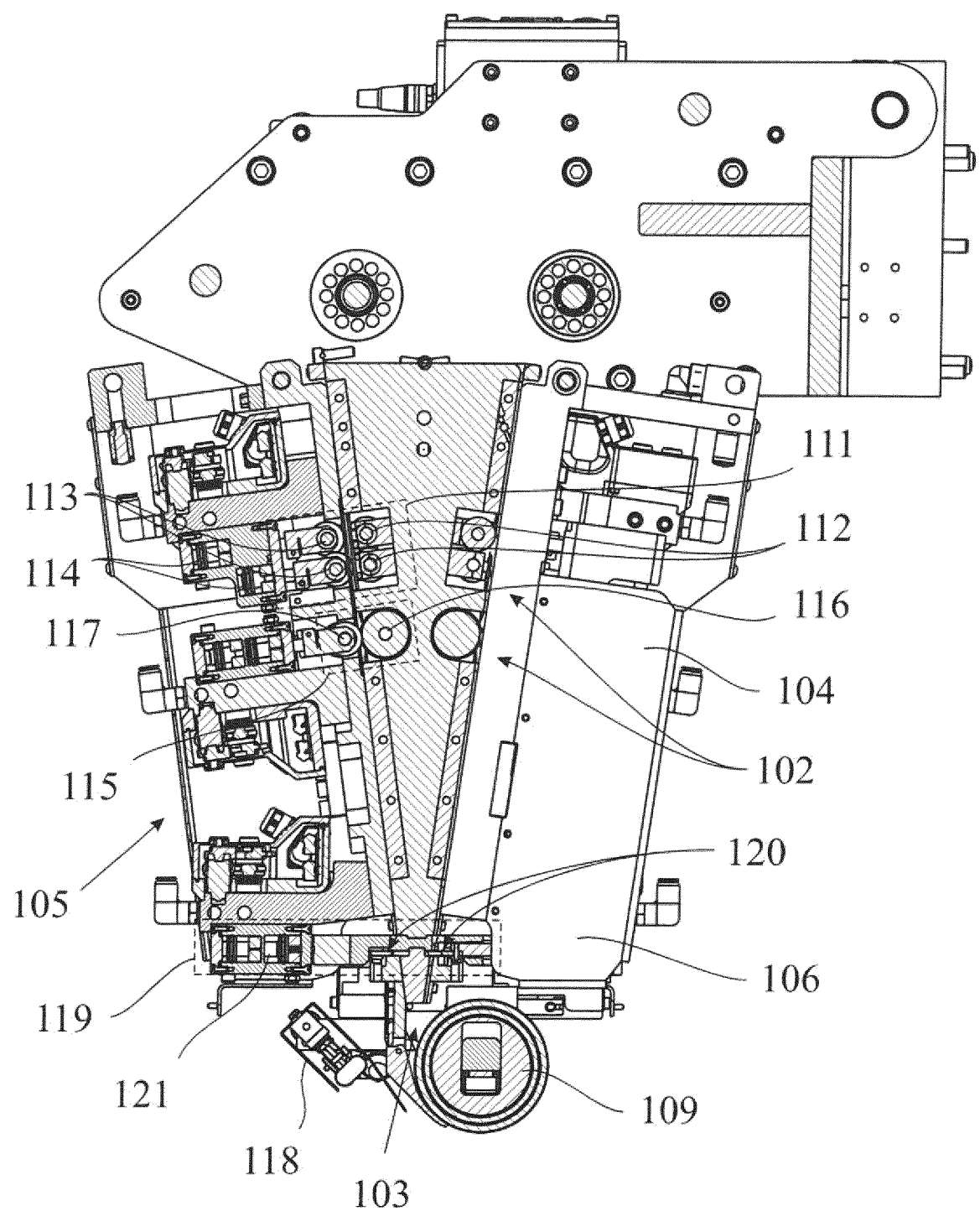

The feeds 101, 102 run at an acute angle of approximately 15° with respect to one another such that a central region 104 of the laying head 26 is formed in a somewhat wedge-shaped manner. A removable upper part 105, 106 is arranged in each case on each side of the wedge-shaped region 104. The upper parts 105, 106 can be pivoted up (see FIG. 8, FIG. 9) and removed in relation to the central region for maintenance purposes.

The two groups of fiber strands 13 are distributed to the two feeds 101, 102 by means of roller guides 107, 108 on the input side of the laying head. In each of the feeds 101, 102, the procedure with the group produced from fiber strands 13 is the same such that the laying head is constructed substantially symmetrically with reference to the two feeds 101, 102.

The fiber strands of the two groups are guided offset by a strand width in the transverse direction or perpendicularly to the movement plane of the laying head such that in the intersection region 103 a fiber strand 13 of the first group and a fiber strand 13 of the second group are always guided alternately in the transverse direction into the resultant fiber band.

Directly after said combining movement, the fiber band runs over a compacting roller 109 which is arranged on the end side of the laying head and by means of which the fiber band is pressed when it is deposited on the workpiece 12.

The intersection region 103 and the compacting roller 109 are heated by means of a heating device 118 in the form of a radiant heater such that a pre-coated binder of the fibers is activated.

Each of the fiber strands 13 are acted upon in the feeds 101, 102, in this case, as described below:

The fiber strands 13 of a feed run in parallel guide grooves 110 which are arranged on the side of the central region 104. In the conveying direction, the fiber strands initially traverse a clamping device 111, by means of which the fiber strands 13 are clampable and releasable again in a controlled manner. The clamping device includes for each of the fiber strands 13 a lower pinch roller 112 which is arranged on the central region and an upper pinch roller 113 which is arranged on the upper part. Consequently, a pair of pinch rollers 112, 113, which interact together and between which the fiber strand is clampable, is provided for each of the fiber strands.

The pinch rollers 113, which are arranged in each case on the upper part, are connected to an actuator 114 for the purpose of releasably clamping, by means of which actuator the upper pinch roller 113 can be pressed against the fiber strand 13 and the lower pinch roller 112.

The pinch roller pair 112, 113 are additionally provided with a freewheel in the conveying direction of the fiber strands 13 such that, in the clamped state too, there is only a clamping action counter to the conveying direction.

A pre-feed roller 115 is arranged behind the clamping device 111 in the conveying direction. The fiber strands can be advanced in a driven manner in the conveying direction by means of the pre-feed roller 115. The pre-feed roller is arranged between the clamping device 111 and the outlet-side compacting roller 109 of the laying head 26.

In the present case, the pre-feed roller 115 is realized as a pair of two interacting rollers 116, 117 which are distributed over the entire width of the group of fiber strands 13. The pre-feed roller is driven by means of a rotary drive.

A cutting device 119 is arranged on the laying head between the pre-feed roller 115 and the outlet-side compacting roller 109. The fibers or the group of fiber strands 13 are severable by means of the cutting device. To this end, the cutting device 119 includes a plurality of separately actuatable cutting members 120 which can sever different parts of the fibers transversely to the laying direction. In the present case, one separately actuatable cutting member 120 is provided for each of the eight fiber strands 13 of a group. Corresponding separate actuation of the cutting members allows for desired shaping of an end or beginning of the laid fiber web.

The cutting device 119 additionally includes an actuator member 121 with eight individual actuators for the individual actuation of the eight cutting members 120. In this case, the actuator member 121 of the cutting members 120 is realized separately and is arranged on the respective upper part 105, 106 of the laying head 26. The cutting members 120, in contrast, are fixed on the central region 104. Once the upper part 105, 106 has been pivoted up, the actuator member 121 is detached from the cutting members 120 such that the cutting members 120 are accessible for maintenance in a rapid and simple manner.

The laying head 26 functions then as follows:

Once a portion of a fiber web has been laid on a workpiece 12, the fiber strands 13 are severed by the cutting device 119 and a front end of the fiber strands 13 is situated in the region of the cutting device. The laying head 26 is moved in the laying direction within the framework of a laying stroke as close as possible to a last spatially-fixed deflecting means 56 of the fiber-providing unit 42. The laying head 26 is then raised from the workpiece in the z direction by a small stroke so that the compacting roller 109 no longer touches the workpiece 12.

The fiber strands 13 to be laid are then clamped in the clamping device 111 of the laying head 26.

The laying head 26 is then moved into a start position by a laying stroke in the y direction relative to the fiber-providing unit 42. In this case, the fibers are pulled out of the fiber-providing unit 42 by a laying stroke on account of the clamping.

The laying head 26 is then moved a little in the direction of a last deflecting means 56 of the fiber-providing unit, the pre-feed roller 115 conveying the fibers in a driven manner until the fiber web arrives at the compacting roller 109. In this connection, on account of the movement of the laying head 26, no fibers are pulled out of the fiber-providing unit 42. In the case of a first portion of the pre-feed of the fibers, the pinch roller can still remain in the clamped state as it comprises a freewheel in the conveying direction of the fibers.

The clamping device is then disengaged. The laying head 26 is lowered onto the workpiece 12 beforehand or subsequently and is thus situated in a start position for laying the fiber web. The workpiece has been moved in the meantime, where applicable, into a modified position or orientation.

The laying head 26 is then moved from the start position into an end position whilst laying the fibers 13 on the workpiece 12. As the fiber strands 13 were advanced out of the fiber-providing unit 42 beforehand, no fibers 13 are pulled out of the fiber-providing unit 42 when the fibers are deposited on the workpiece 12.

It is possible that moving the fibers forward according to the disclosure by a laying stroke irrespective of a positioning of the spool storage units 43, 44 is realizable. Pulling out by a laying stroke is effected in each case as a result of the movement of the laying head relative to a last spatially-fixed deflecting means of the fiber-providing unit 42.

Correspondingly, the positioning, in particular of the spool storage units 43, 44 relative to the laying head 26 is extensively freely selectable.

The invention claimed is:

1. A fiber-laying machine for producing laid fiber scrims, comprising:
   a tool table for feeding a workpiece along a feed direction;
   a laying head for applying fibers onto the workpiece; and
   a fiber-providing unit for feeding several fiber strands to the laying head, wherein the fiber-providing unit comprises a spool and at least one hopper;
   wherein the several fiber strands are combined on the laying head to form a fiber web which is to be applied onto the workpiece;
   wherein the laying head is movable relative to the fiber-providing unit in a laying direction; and
   wherein a clamping device is arranged on the laying head for releasably clamping the fiber strands, wherein a portion of the fiber web is laid on the workpiece once the fiber strands have been pulled forward such that while the fibers are being applied on the workpiece, no fibers are pulled out of the fiber-providing unit.

2. The fiber-laying machine as claimed in claim 1, wherein the workpiece is arranged on an automated conveyable pallet.

3. The fiber-laying machine as claimed in claim 2, wherein a surface of the pallet carrying the workpiece slopes at an angle of less than 30 degrees in relation to a perpendicular.

4. The fiber-laying machine as claimed in claim 3, wherein the laying direction runs in a plane which slopes at an angle of less than 30 degrees in relation to the perpendicular.

5. The fiber-laying machine as claimed in claim 1, wherein the fibers are severable by a cutting device arranged on the laying head, wherein the cutting device includes a plurality of separately actuatable cutting members which can sever different parts of the fibers transversely with respect to the laying direction.

6. The fiber-laying machine as claimed in claim 5, wherein the cutting device includes an actuator member for actuating at least one of the cutting members, wherein the actuator member is realized separately from the cutting member and is arranged on an upper part of the laying head which can be removed for maintenance purposes.

7. The fiber-laying machine as claimed in claim 1, wherein the fiber-providing unit is arranged in a stationary manner, wherein the laying head is movable relative to the fiber-providing unit only in precisely one plane.

8. The fiber-laying machine as claimed in claim 1, wherein the clamping device is disengaged whilst the portion of the fiber web is laid.

9. The fiber-laying machine as claimed in claim 1, wherein the clamping device includes at least one pinch roller.

10. The fiber-laying machine as claimed in claim 1, wherein the laying head includes two feeds which run at an angle with respect to one another, wherein by a first of the feeds a first group of fiber strands and by a second of the feeds a second group of fiber strands are guided into an intersection region in order to combine the two groups of fiber strands to form the fiber web.

11. The fiber-laying machine as claimed in claim 1, further comprising at least one pre-feed roller on the laying head for the driven forward feed, wherein the pre-feed roller is arranged between the clamping device and an outlet-side compacting roller of the laying head.

12. The fiber-laying machine as claimed in claim 1, wherein the fiber-laying machine is constructed completely on a machine frame.

13. The fiber-laying machine as claimed in claim 1, wherein the fiber laying machine includes a climatically closed housing.

14. The fiber-laying machine as claimed in claim 1, wherein the respective fiber strands are wound onto interchangeable spools, wherein the spools sit on rotational axes which are driven counter to an unwinding direction, wherein the drives of the rotational axes comprise a torque limitation element.

15. A system for producing fiber composite components, comprising:
   at least one first fiber laying machine as claimed in claim 1, for applying laid fiber scrims onto a workpiece; and
   a further processing station, different from the at least one first fiber-laying machine, for modifying the workpiece;
   wherein the workpiece is movable by an automated conveying device both to the fiber-laying machine and to the further processing station.

16. The system as claimed in claim 15, further comprising a second fiber-laying machine which is structurally identical to the first fiber-laying machine, wherein the second fiber-laying machine is spatially separated from the first fiber-laying machine and is connected to the first fiber-laying machine by the automated conveying device.

17. The system as claimed in claim 16, further comprising a plurality of fiber-laying machines provided as parallel processing stations which carry out the same processing steps on simultaneously processed workpieces.

18. The system as claimed in claim 16, wherein the plurality of fiber-laying machines carry out different processing steps one after another on a workpiece as sequential processing stations.

19. The system as claimed in claim 15, wherein the automated conveying device comprises a loading device, by which it is possible to load and unload the fiber-laying machine from only one side.

20. The system as claimed in claim 19, wherein the loading device is realized as a rotation-reversing device which comprises a rotatable bracket for receiving at least two workpieces.

21. The system as claimed in claim 15, wherein the system includes at least one buffer station for receiving, storing and forwarding several workpieces.

22. The system as claimed in claim 15, wherein the further processing station comprises at least one item selected from the group consisting of: a forming device, a temperature chamber and a painting device.

23. The system as claimed in claim 15, wherein a laying head of the fiber-laying machine is movable in a perpendicular plane, wherein an angle between the perpendicular plane and a loading path of the fiber-laying machine is between 0° and 30°.

24. The system as claimed in claim 15, wherein a laying head of the fiber-laying machine is movable in a perpendicular plane, wherein a fiber spool storage unit of the fiber-laying machine includes a plurality of fiber spools with spool axes which are parallel with respect to one another, and wherein an angle between the spool axes and the perpendicular plane is between 60° and 90°.

25. A method for laying a fiber web on a workpiece, the method comprising:

clamping a plurality of fibers to be laid in a clamping device of a laying head;

moving the laying head into a start position relative to a fiber-providing unit, wherein the fiber-providing unit comprises a spool and at least one hopper, wherein the plurality of fibers are pulled out of the fiber-providing unit;

disengaging the clamping device; and moving the laying head from the start position into an end position whilst laying the plurality of fibers on the workpiece such that whilst the fibers are being applied on the workpiece, no fibers are pulled out of the fiber-providing unit.

26. The method as claimed in claim 25, wherein after disengaging the clamping device the fibers are moved in relation to the laying head by a driven pre-feed roller, wherein the fibers are not pulled out of the fiber-providing unit by the pre-feed roller.

* * * * *